US012615307B2

(12) United States Patent
Huang et al.

(10) Patent No.: US 12,615,307 B2
(45) Date of Patent: Apr. 28, 2026

(54) INFORMATION DETERMINING METHOD AND DEVICE

(71) Applicant: HUAWEI TECHNOLOGIES CO., LTD., Shenzhen (CN)

(72) Inventors: Zhenglei Huang, Shenzhen (CN); Hui Ni, Beijing (CN); Yongcui Li, Beijing (CN); Qi Pan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 18/147,033

(22) Filed: Dec. 28, 2022

(65) Prior Publication Data

US 2023/0134468 A1     May 4, 2023

Related U.S. Application Data

(63) Continuation of application No. PCT/CN2021/102914, filed on Jun. 29, 2021.

(30) Foreign Application Priority Data

Jun. 30, 2020     (CN) .......................... 202010612756.7

(51) Int. Cl.
*H04L 12/00*          (2006.01)
*H04L 65/1083*       (2022.01)
               (Continued)

(52) U.S. Cl.
CPC .......... *H04L 65/80* (2013.01); *H04L 65/1083* (2013.01); *H04L 65/61* (2022.05); *H04L 65/752* (2022.05); *H04W 28/22* (2013.01)

(58) Field of Classification Search
CPC ..... H04L 65/80; H04L 65/1083; H04L 65/61; H04L 65/752; H04W 28/22
(Continued)

(56) References Cited

U.S. PATENT DOCUMENTS 11,159,408 B2 *  10/2021  Svennebring ......... H04L 41/147
2004/0076164 A1 *  4/2004  Vanderveen .......... H04W 40/18
                                                            370/400
(Continued)

FOREIGN PATENT DOCUMENTS

CN          1829233 A        9/2006
CN         101202749 A       6/2008
(Continued)

OTHER PUBLICATIONS

Shi et al., CN 111277870 A, Bandwidth prediction method, device, server and storage medium, 2020, (Year: 2020).*
(Continued)

*Primary Examiner* — Frantz Coby
(74) *Attorney, Agent, or Firm* — HAUPTMAN HAM, LLP

(57) ABSTRACT

An information determining method and a related device. In the method, a first network element receives first information from a first terminal device, where the first information includes first indication information. The first network element determines, based on the first indication information, a first access network device connected to the first access network device, determines second information based on historical statistical information of a bandwidth between the first access network device and the first terminal device, and further sends the second information to a second network element, where the second information is useable for determining a first code rate, and the first code rate indicates a code rate of media data of first media received by the first terminal device. This improves accuracy and real-time performance of code rate adjustment of the media data, and further improve effectiveness of the code rate adjustment.

16 Claims, 9 Drawing Sheets

(51) Int. Cl.

| | |
|---|---|
| *H04L 65/61* | (2022.01) |
| *H04L 65/752* | (2022.01) |
| *H04L 65/80* | (2022.01) |
| *H04W 28/22* | (2009.01) |

(58) Field of Classification Search
USPC ........................................................ 370/230
See application file for complete search history.

(56) References Cited

U.S. PATENT DOCUMENTS

| | | | | |
|---|---|---|---|---|
| 2012/0278496 | A1 * | 11/2012 | Hsu | H04N 21/439 |
| | | | | 709/231 |
| 2015/0372927 | A1 | 12/2015 | Lv | |
| 2017/0164271 | A1 * | 6/2017 | Natarahjan | H04W 48/16 |
| 2019/0319868 | A1 * | 10/2019 | Svennebring | H04W 24/08 |
| 2023/0134468 | A1 * | 5/2023 | Huang | H04L 65/61 |
| | | | | 370/230 |
| 2023/0388360 | A1 * | 11/2023 | Chen | H04N 21/6131 |
| 2024/0349367 | A1 * | 10/2024 | Xu | H04W 36/165 |

FOREIGN PATENT DOCUMENTS

| | | | | | |
|---|---|---|---|---|---|
| CN | 103248962 | A | 8/2013 | | |
| CN | 106027312 | A | 10/2016 | | |
| CN | 106878297 | A | 6/2017 | | |
| CN | 111277870 | A | 6/2020 | | |
| EP | 2489167 | B1 | 4/2018 | | |
| EP | 4277289 | A1 * | 11/2023 | ....... | H04N 21/44004 |
| EP | 4447546 | A1 * | 10/2024 | ............ | H04W 76/11 |
| JP | 2012244492 | A | 12/2012 | | |
| JP | 2014515144 | A | 6/2014 | | |
| WO | WO-2010130193 | A1 * | 11/2010 | ............. | H04W 4/00 |

OTHER PUBLICATIONS

Zhang Zhonghao, CN 106878297, A Media data transmission method, base station and server, 2017 (Year: 2017).*

Japanese Office Action issued in corresponding Japanese Application No. 2022-581390, dated Feb. 6, 2024, pp. 1-7.

Extended European Search Report issued in corresponding European Application No. 21831980.4, dated Oct. 19, 2023, pp. 1-10.

Chinese Office Action issued in corresponding Chinese Application No. 202010612756.7, dated Aug. 20, 2024, pp. 1-18.

Saamer Akhshabi et al., An experimental evaluation of rate-adaptive video players over HTTP. Signal Processing: Image Communication, vol. 27, Issue 4, Apr. 2012, pp. 271-287.

Zhi Li et al., Probe and Adapt: Rate Adaptation for HTTP Video Streaming at Scale. IEEE Journal on Selected Areas in Communications, vol. 32, No. 4, Apr. 2014, 15 pages.

3GPP TS 23.501 V16.4.0 (Mar. 2020), 3rd Generation Partnership Project; Technical Specification Group Services and System Aspects; System architecture for the 5G System (5GS); Stage 2(Release 16), 430 pages.

India Office Action issued in corresponding India Application No. 202247075666, dated Mar. 2, 2023, pp. 1-7.

International Search Report issued in corresponding International Application No. PCT/CN2021/102914, dated Sep. 8, 2021, pp. 1-10.

* cited by examiner

INFORMATION DETERMINING METHOD AND DEVICE

CROSS-REFERENCE TO RELATED APPLICATIONS

This application is a continuation of International Patent Application No. PCT/CN2021/102914, filed on Jun. 29, 2021, which claims priority to Chinese Patent Application No. 202010612756.7, filed on Jun. 30, 2020. The disclosures of the aforementioned applications are hereby incorporated by reference in their entireties.

BACKGROUND

A code rate of media is also referred to as a bit rate, and may indicate a quantity of bits occupied by the media per unit of time. A media file with a higher code rate indicates more bits occupied by media per unit of time. Under a same media playing condition, a media file with a higher code rate provides better media experience for a user than a media file with a lower code rate. For example, a video with a higher code rate has better image quality, and audio with a higher code rate has a better sound effect. Correspondingly, a media file with a higher code rate has a larger size. In this case, in a process of transmitting a media file from a media server to a terminal, transmitting a media file corresponding to media per unit of time needs a higher bandwidth. If the bandwidth for transmitting the media file is not high enough, time needed for transmitting the file corresponding to the media per unit of time is long, and frame freezing and unsmooth playing may occur in some real-time playing scenarios.

Currently, in a process of receiving a media file, some terminals may each estimate a currently available bandwidth in real time based on an average transmission control protocol (Transmission Control Protocol, TCP) throughput of the terminal within a time window before a current moment, and further adjust a code rate of the media file based on the estimated bandwidth. In this manner, the time window for estimating the bandwidth is usually ten seconds or dozens of seconds. If the bandwidth of the terminal within the time window changes, and consequently a TCP throughput of the terminal changes (that is, in this case, the code rate of the media file transmitted by the media server to the terminal needs to be adjusted; otherwise, a problem such as frame freezing or poor media quality occurs), after the time window ends, the terminal needs to average TCP throughputs within the time window, further estimate a bandwidth based on an average value, and further determine an adjusted code rate.

Throughput variables caused by a bandwidth change are averaged by time of the entire time window, which weakens an impact of the bandwidth change. As a result, the estimated bandwidth and the adjusted code rate determined based on the bandwidth are inaccurate. In addition, the terminal can only average the TCP throughputs after each time window ends to adjust the code rate, but cannot adjust the code rate immediately when the bandwidth changes. Consequently, the code rate may not be adjusted in a timely manner, which causes a problem of a hysteresis. Therefore, this manner of adjusting the code rate is less effective.

SUMMARY

Embodiments described herein provide an information determining method and a device. In at least one embodiment, a network condition of a media transmission link of a terminal is predicted in real time based on historical statistical information of a bandwidth of the media transmission link, and then a code rate of transmitted media data is adjusted in real time based on information obtained through prediction, to improve accuracy and real-time performance of code rate adjustment of the media data, and further improve effectiveness of the code rate adjustment.

A first aspect in at least one embodiment provides an information determining method. The method is applied to a scenario in which before playing first media online, a first terminal device determines a fixed first code rate for playing the first media online. The first terminal device determines second information based on historical statistical information of a bandwidth, and determine, based on the second information, the fixed first code rate for playing a short video by the first terminal device. Alternatively, the method is applied to a scenario in which in a process of playing first media, a first terminal device periodically determines a first code rate for playing the first media and further periodically adjust the code rate for playing the first media. The first terminal device periodically determines second information based on historical usage information of a bandwidth, and adjust, in real time based on the second information, the code rate for playing a video by the first terminal device.

In the method, the first terminal device sends first information of the first terminal device to a first network element, where the first information of the first terminal device includes first indication information, and the first indication information is used by the first network element to determine a first access network device connected to the first terminal device. The first terminal device further determines the second information based on historical statistical information of a bandwidth between the first access network device and the first terminal device, where the second information is useable for determining the first code rate, and the first code rate indicates a code rate of media data of the first media received by the first terminal device.

In the method, the first network element predicts a network condition of a media transmission link of the terminal in real time based on historical statistical information of a bandwidth of the media transmission link, and then adjusts the code rate of the transmitted media data in real time based on the second information obtained through prediction. In addition, compared with a bandwidth change that is of the first terminal device and that is obtained through averaging within a time window, the historical statistical information of the bandwidth between the first access network device and the first terminal device more accurately reflects a change rule of the bandwidth between the first access network device and the first terminal device. Therefore, accuracy and real-time performance of code rate adjustment is ensured, and effectiveness of the code rate adjustment is improved.

With reference to the first aspect, in an optional manner, the first indication information includes location information of the first terminal device.

With reference to the first aspect, in an optional manner, the first indication information includes an identifier of the first access network device.

With reference to the first aspect, in an optional manner, the first information further includes first period indication information, and the first period indication information indicates a period within which the first terminal device receives the media data of the first media. In this way, the first network element predicts a link over which the first terminal device receives the media data of the first media within a first period, to improve pertinence and accuracy of prediction, and further improve the effectiveness of the code rate adjustment.

With reference to the first aspect, in an optional manner, the first information further includes one or more of the following information: a media identifier, an optional code rate, or state information of the first media, where the state information indicates a state of the media data of the first media buffered by the first terminal device.

With reference to the first aspect, in an optional manner, the first information further includes second indication information, and the second indication information indicates a first user plane network element corresponding to the first terminal device. The first network element determines the second information based on the historical statistical information of the bandwidth between the first access network device and the first terminal device and historical statistical information of a bandwidth between the first access network device and the first user plane network element. The first network element predicts a link segment between the first terminal device and the first access network device and a link segment between the first access network device and the first user plane network element that are of the link over which the first terminal device receives the media data of the first media, to obtain the second information, so as to improve pertinence and accuracy of prediction, and further improve the effectiveness of the code rate adjustment.

With reference to the first aspect, in an optional manner, the second information includes a recommended code rate or information about a first bandwidth.

With reference to the first aspect, in an optional manner, the recommended code rate is one code rate determined from at least two optional code rates corresponding to the first media.

With reference to the first aspect, in an optional manner, the first code rate is determined based on the second information and one or both of the state information or throughput information of the first terminal device, where the state information indicates the state of the media data of the first media buffered by the first terminal device. The first code rate is determined based on the second information and the state information corresponding to the first terminal device and/or the throughput information of the first terminal device. The first code rate is determined based on comprehensive information, to ensure reliability of the first code rate, and further improve the effectiveness of the code rate adjustment.

With reference to the first aspect, in an optional manner, the first code rate is determined by the first terminal device based on the second information.

A second aspect in at least one embodiment provides another information determining method. In the method, a first network element receives first information from a first terminal device, where the first information includes first indication information. The first network element determines, based on the first indication information, a first access network device connected to the first access network device. Further, the first network element determines second information based on historical statistical information of a bandwidth between the first access network device and the first terminal device, where the second information is useable for determining a first code rate, and the first code rate indicates a code rate of media data of first media received by the first terminal device. The first network element sends the second information to a second network element.

The first network element is a network element having an analysis and statistics function based on big data, artificial intelligence, or the like. The first network element predicts a network condition of a media transmission link of the terminal based on historical statistical information of a bandwidth of the media transmission link, so that the second network element adjusts the code rate of the transmitted media data based on the second information obtained through prediction of the first network element, to improve accuracy and real-time performance of code rate adjustment of the media data, and further improve effectiveness of the code rate adjustment.

With reference to the second aspect, in an optional manner, the first indication information includes location information of the first terminal device.

With reference to the second aspect, in an optional manner, the first indication information includes an identifier of the first access network device.

With reference to the second aspect, in an optional manner, the second network element includes the first terminal device and/or a media server. Diversified code rate adjustment is implemented in a plurality of manners.

With reference to the second aspect, in an optional manner, the first network element obtains an identifier of the first terminal device, send the identifier of the first access network device and the identifier of the first terminal device to a network management network element, and receive historical statistical information that is of the bandwidth between the first access network device and the first terminal device and that is returned by the network management network element.

With reference to the second aspect, in an optional manner, the first information further includes first period indication information, and the first period indication information indicates a period within which the first terminal device receives the media data of the first media. In this way, the first network element predicts a link over which the first terminal device receives the media data of the first media within a first period, to improve pertinence and accuracy of prediction, and further improve the effectiveness of the code rate adjustment.

With reference to the second aspect, in an optional manner, the first information further includes one or more of the following information: a media identifier, an optional code rate, or state information of the first media, where the state information indicates a state of the media data of the first media buffered by the first terminal device.

With reference to the second aspect, in an optional manner, the first information further includes second indication information, and the second indication information indicates a first user plane network element corresponding to the first terminal device. Therefore, in a process of determining the second information, the first network element determines the second information based on the historical statistical information of the bandwidth between the first access network device and the first terminal device and historical statistical information of a bandwidth between the first access network device and the first user plane network element. The first network element predicts a link segment between the first terminal device and the first access network device and a link segment between the first access network device and the first user plane network element that are of the link over which the first terminal device receives the media data of the first media, to improve pertinence and accuracy of prediction, and further improve the effectiveness of the code rate adjustment.

With reference to second aspect, in an optional manner, the second information includes a recommended code rate or information about a first bandwidth.

With reference to the second aspect, in an optional manner, in a process of determining the second information, the first network element determines the information about the first bandwidth between the first terminal device and the first access network device based on the historical statistical information of the bandwidth between the first access network device and the first terminal device, and further determine the recommended code rate based on the information about the first bandwidth.

With reference to the second aspect, in an optional manner, in a process of determining the recommended code rate, the first network element determines, based on the information about the first bandwidth, the recommended code rate from at least two optional code rates corresponding to the first media.

With reference to the second aspect, in an optional manner, the first code rate is determined by the second network element based on the second information and one or both of the state information or throughput information of the first terminal device, where the state information indicates the state of the media data of the first media buffered by the first terminal device. The first code rate is determined based on the second information and the state information corresponding to the first terminal device and/or the throughput information of the first terminal device. The first code rate is determined based on comprehensive information, to ensure reliability of the first code rate, and further improve the effectiveness of the code rate adjustment.

With reference to the second aspect, in an optional manner, before determining the second information, the first network element further receives an identifier of a second terminal device, where the second terminal device is a terminal device that receives media data of second media through the first access network device, and there are one or more second terminal devices. Further, in a process of determining the second information, the first network element determines the second information based on the identifier of the second terminal device and the historical statistical information of the bandwidth between the first access network device and the first terminal device. In a process of determining the second information of the first terminal device, each second terminal device connected to the first access network device is considered, so that the first terminal device and each second terminal device appropriately and fairly occupy a shared bandwidth of the first access network device, and effectiveness of bandwidth utilization of the first access network device is also ensured.

With reference to the second aspect, in an optional manner, in a process of determining the second information based on the identifier of the second terminal device and the historical statistical information of the bandwidth between the first access network device and the first terminal device, details is as follows: The first network element obtains third information based on the identifier of the second terminal device, where the third information includes one or more of the following information: an optional code rate of the second media, information about a state of the media data of the second media buffered by the first terminal device, third indication information, and second period indication information, the third indication information indicates a second user plane network element corresponding to the second terminal device, and the second period indication information indicates a period within which the second terminal device receives the media data of the second media; and the first network element determines the second information based on the third information and the historical statistical information of the bandwidth between the first access network device and the first terminal device.

A third aspect in at least one embodiment provides a first terminal device. The first terminal device includes a first transceiver module, configured to: send first information to a first network element, and receive second information from the first network element. The first information includes first indication information, and the first indication information is useable for determining a first access network device connected to the first terminal device. The second information is determined by the first network element based on historical statistical information of a bandwidth between the first access network device and the first terminal device. The second information is useable for determining a first code rate. The first code rate indicates a code rate of media data of first media received by the first terminal device.

After the first transceiver module sends the first information to the first network element, the first network element predicts a network condition of a media transmission link of the terminal based on historical statistical information of a bandwidth of the media transmission link, and then adjusts the code rate of the transmitted media data based on the second information obtained through prediction, to improve accuracy and real-time performance of code rate adjustment of the media data, and further improve effectiveness of the code rate adjustment.

With reference to the third aspect, in an optional manner, the first indication information includes location information of the first terminal device.

With reference to the third aspect, in an optional manner, the first indication information includes an identifier of the first access network device.

With reference to the third aspect, in an optional manner, the first information further includes first period indication information, and the first period indication information indicates a period within which the first terminal device receives the media data of the first media. In this way, the first network element predicts a link over which the first terminal device receives the media data of the first media within a first period, to improve pertinence and accuracy of prediction, and further improve the effectiveness of the code rate adjustment.

With reference to the third aspect, in an optional manner, the first information further includes second indication information, and the second indication information indicates a first user plane network element corresponding to the first terminal device. The first network element determines the second information based on the historical statistical information of the bandwidth between the first access network device and the first terminal device and historical statistical information of a bandwidth between the first access network device and the first user plane network element. The first network element predicts a link segment between the first terminal device and the first access network device and a link segment between the first access network device and the first user plane network element that are of the link over which the first terminal device receives the media data of the first media, to obtain the second information, so as to improve pertinence and accuracy of prediction, and further improve the effectiveness of the code rate adjustment.

With reference to the third aspect, in an optional manner, the first information further includes one or more of the following information: a media identifier, an optional code rate, or state information of the first media, where the state information indicates a state of the media data of the first media buffered by the first terminal device. The first code rate is determined based on the second information and the state information corresponding to the first terminal device and/or the throughput information of the first terminal device. The first code rate is determined based on comprehensive information, to ensure reliability of the first code rate, and further improve the effectiveness of the code rate adjustment.

With reference to third aspect, in an optional manner, the second information includes a recommended code rate or information about a first bandwidth.

With reference to the third aspect, in an optional manner, the recommended code rate is one code rate determined from at least two optional code rates corresponding to the first media.

With reference to the third aspect, in an optional manner, the first code rate is determined based on the second information and one or both of the state information or throughput information of the first terminal device, where the state information indicates the state of the media data of the first media buffered by the first terminal device.

With reference to the third aspect, in an optional manner, the first terminal device further includes a first processing module, and the first processing module is configured to determine the first code rate based on the second information.

A fourth aspect in at least one embodiment provides a communication device. The communication device includes a second transceiver module and a second processing module. The second transceiver module is configured to receive first information. The first information includes first indication information. The second processing module is configured to determine, based on the first indication information, a first access network device connected to a first terminal device, and is further configured to determine second information based on historical statistical information of a bandwidth between the first access network device and the first terminal device. The second transceiver module is further configured to send the second information to a second network element. The second information is useable for determining a first code rate, and the first code rate indicates a code rate of media data of first media received by the first terminal device.

The second processing module predicts a network condition of a media transmission link of the terminal based on historical statistical information of a bandwidth of the media transmission link, so that a second network element adjusts the code rate of the transmitted media data based on the second information obtained through prediction of a first network element, to improve accuracy and real-time performance of code rate adjustment of the media data, and further improve effectiveness of the code rate adjustment.

With reference to the fourth aspect, in an optional manner, the first indication information includes location information of the first terminal device.

With reference to the fourth aspect, in an optional manner, the first indication information includes an identifier of the first access network device.

With reference to the fourth aspect, in an optional manner, the second network element includes the first terminal device and/or a media server. Diversified code rate adjustment is implemented in a plurality of manners.

With reference to the fourth aspect, in an optional manner, the second transceiver module is further configured to: obtain an identifier of the first terminal device, send the identifier of the first access network device and the identifier of the first terminal device to a network management network element, and receive the historical statistical information that is of the bandwidth between the first access network device and the first terminal device and that is returned by the network management network element.

With reference to the fourth aspect, in an optional manner, the first information further includes first period indication information, and the first period indication information indicates a period within which the first terminal device receives the media data of the first media. In this way, the second processing module predicts a link over which the first terminal device receives the media data of the first media within a first period, to improve pertinence and accuracy of prediction, and further improve the effectiveness of the code rate adjustment.

With reference to the fourth aspect, in an optional manner, the first information further includes one or more of the following information: a media identifier, an optional code rate, or state information of the first media, where the state information indicates a state of the media data of the first media buffered by the first terminal device.

With reference to the fourth aspect, in an optional manner, the first information further includes second indication information, and the second indication information indicates a first user plane network element corresponding to the first terminal device. Further, the second processing module is specifically configured to determine the second information based on the historical statistical information of the bandwidth between the first access network device and the first terminal device and historical statistical information of a bandwidth between the first access network device and the first user plane network element. The second processing module predicts a link segment between the first terminal device and the first access network device and a link segment between the first access network device and the first user plane network element that are of the link over which the first terminal device receives the media data of the first media, to improve pertinence and accuracy of prediction, and further improve the effectiveness of the code rate adjustment.

With reference to fourth aspect, in an optional manner, the second information includes a recommended code rate or information about a first bandwidth.

With reference to the fourth aspect, in an optional manner, the second processing module is specifically configured to: determine the information about the first bandwidth between the first terminal device and the first access network device based on the historical statistical information of the bandwidth between the first access network device and the first terminal device, and determine the recommended code rate based on the information about the first bandwidth.

With reference to the fourth aspect, in an optional manner, the second processing module is specifically configured to determine, based on the information about the first bandwidth, the recommended code rate from at least two optional code rates corresponding to the first media.

With reference to the fourth aspect, in an optional manner, the first code rate is determined by the second network element based on the second information and one or both of the state information or throughput information of the first terminal device, where the state information indicates the state of the media data of the first media buffered by the first terminal device. The first code rate is determined based on the second information and the state information corresponding to the first terminal device and/or the throughput information of the first terminal device. The first code rate is determined based on comprehensive information, to ensure reliability of the first code rate, and further improve the effectiveness of the code rate adjustment.

With reference to the fourth aspect, in an optional manner, the second transceiver module is further configured to receive an identifier of a second terminal device, where the second terminal device is a terminal device that receives media data of second media through the first access network device, and there are one or more second terminal devices. The second processing module is specifically configured to determine the second information based on the identifier of the second terminal device and the historical statistical information of the bandwidth between the first access network device and the first terminal device.

With reference to the fourth aspect, in an optional manner, the first processing module is specifically configured to determine the second information in the following manner: The first processing module obtains third information based on the identifier of the second terminal device, where the third information includes one or more of the following information: an optional code rate of the second media, information about a state of the media data of the second media buffered by the second terminal device, third indication information, and second period indication information, the third indication information indicates a second user plane network element corresponding to the second terminal device, and the second period indication information indicates a period within which the second terminal device receives the media data of the second media; and the first processing module determines the second information based on the third information and the historical statistical information of the bandwidth between the first access network device and the first terminal device. In a process of determining the second information of the first terminal device, each second terminal device connected to the first access network device is considered, so that the first terminal device and each second terminal device appropriately and fairly occupy a shared bandwidth of the first access network device, and effectiveness of bandwidth utilization of the first access network device is also ensured.

A fifth aspect in at least one embodiment provides another first terminal device. The first terminal device includes a processor, a memory, and a communication interface. The processor, the memory, and the communication interface are connected to each other. The communication interface is configured to receive and send data. The memory is configured to store a program. The processor is configured to invoke the program stored in the memory. In response to the program being executed by a computer, the computer is enabled to perform the information determining method according to any one of the first aspect. The processor and the memory is physically independent units, or the memory is integrated with the processor.

A sixth aspect in at least one embodiment provides another communication device. The communication device includes a processor, a memory, and a communication interface. The processor, the memory, and the communication interface are connected to each other. The communication interface is configured to receive and send data. The memory is configured to store a program. The processor is configured to invoke the program stored in the memory. In response to the program being executed by a computer, the computer is enabled to perform the information determining method according to any one of the second aspect.

A seventh aspect in at least one embodiment provides a computer-readable medium. The computer-readable medium stores instructions. In response to the instructions being run on a computer, the computer is enabled to perform the information determining method according to any one of the first aspect, or perform the information determining method according to any one of the second aspect.

An eighth aspect in at least one embodiment provides a computer program product. The computer program product includes computer program code. In response to the computer program code being run on a computer, the computer is enabled to perform the method according to any one of the first aspect, or perform the information determining method according to any one of the second aspect.

A ninth aspect in at least one embodiment provides a chip. The chip includes a processor and a communication interface. The processor is coupled to the communication interface, to implement the information determining method according to any one of the first aspect or the optional implementations, or implement the information determining method according to any one of the second aspect.

BRIEF DESCRIPTION OF DRAWINGS

To describe technical solutions in embodiments more clearly, the following briefly describes the accompanying drawings for embodiments. The accompanying drawings in the following descriptions show merely some embodiments, and a person of ordinary skill in the art is able to derive other drawings from these accompanying drawings without creative efforts.

DESCRIPTION OF EMBODIMENTS

The following clearly and completely describes technical solutions in at least one embodiment with reference to the accompanying drawings. Embodiments described herein are some but not all of embodiments. All other embodiments obtained by a person of ordinary skill in the art based on embodiments described herein without creative efforts shall fall within the protection scope at least one embodiment.

The following describes implementations of embodiments in detail with reference to the accompanying drawings. In the descriptions of embodiments described herein, "/" means "or" unless otherwise specified. For example, AB indicates A or B. In this specification, "and/or" describes only an association relationship for describing associated objects and indicates that three relationships exist. For example, A and/or B indicates the following three cases: Only A exists, both A and B exist, and only B exists. In addition, in the descriptions of at least one embodiment, "a plurality of" means two or more.

Figure 1:
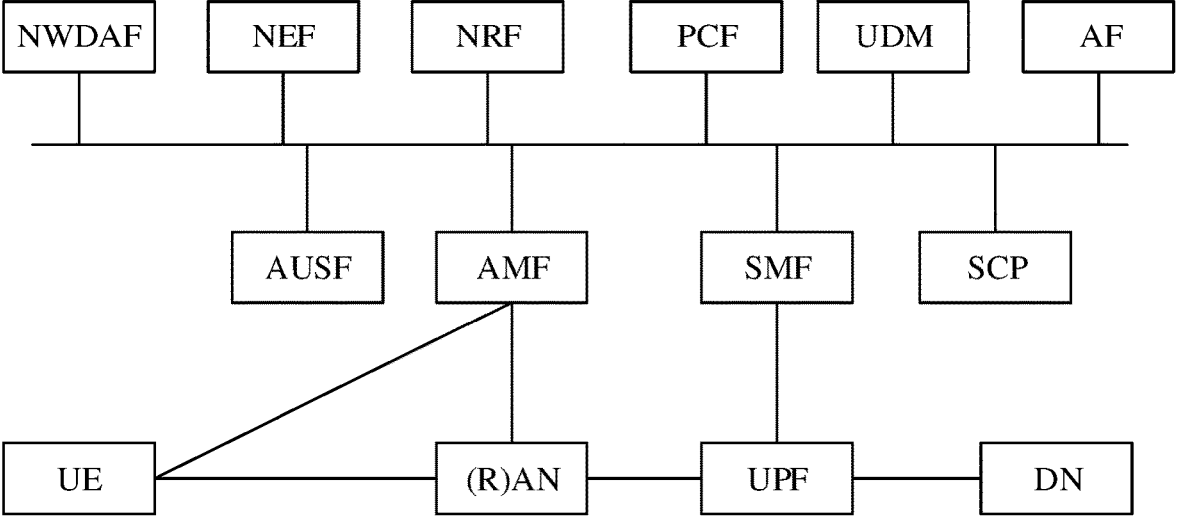
FIG. 1 is a schematic diagram of an architecture of a 5G system according to at least one embodiment.

An information determining method in at least one embodiment is implemented based on a 5G system defined in 3rd generation partnership project (3rd Generation Partnership Project, 3GPP) TS 23.501. Before the information determining method in at least one embodiment is described, an architecture of the 5G system is first described with reference to FIG. 1. FIG. 1 is a schematic diagram of an architecture of a 5G system according to at least one embodiment. The 5G system includes an access network and a core network, and the access network and the core network include different network elements. For example, the network elements in the access network include a (radio) access network ((Radio) Access Network, (R)AN) device. A terminal device is connected to the core network through the (R)AN device. The network elements in the core network include a plurality of network function (Network Function, NF) network elements, for example, an access and mobility management function (Access and Mobility Management Function, AMF) network element, a session management function (Session Management Function, SMF) network element, a policy control function (Policy Control Function, PCF) network element, a user plane function (User plane function, UPF) network element, an authentication server function (Authentication Server Function, AUSF) network element, a network data analytics function (Network Data Analytics Function, NWDAF) network element, and an NEF network element. The core network is connected to a data network (Data Network, DN), and different application function (Application Function, AF) network elements is included in the DN, to provide different application functions for the core network.

The following separately describes network elements or devices that is mentioned in embodiments described herein.

The terminal device is also referred to as user equipment (user equipment, UE), a mobile station, a remote station, and the like, and is a network device having a wireless transceiver function. The terminal device is deployed on land, for example, including an indoor or outdoor device, a handheld device, a wearable device, or a vehicle-mounted device; is deployed on water (for example, on a ship); or is deployed in the air (for example, on an airplane, a balloon, and a satellite). The terminal device in at least one embodiment is a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. A specific technology, a device form, and a name used by the terminal are not limited in at least one embodiment.

The (R)AN device is located between the UE and the core network, and provides a network access function for the terminal device.

The AMF network element includes functions such as UE registration management, reachability detection, and SMF network element selection, transmits a session management (Session Management, SM) message between the UE and the SMF, and the like.

The SMF network element performs session management (for example, session establishment, modification, and deletion), IP address allocation and management of the UE, UPF node selection, and the like.

The UPF network element routes and forwards a data packet, serve as a mobility anchor inside and outside a system, serve as an uplink classifier to support routing of a service flow to a data network, serve as a branch point to support a multi-homed protocol data unit (Protocol Data Unit, PDU) session, and the like.

The NWDAF network element collects and analyzes network data based on technologies such as big data and artificial intelligence, and provide an analysis result for another network function network element.

The NEF network element supports capability and time exposure of the core network, securely provide information of a 3GPP network through an external application process, support internal and external information translation, and the like.

The AF network element interacts with a network function in the core network to provide a service, for example, affect service flow routing, support access network capability exposure, and support policy control.

In an operation administration and maintenance (Operation Administration and Maintenance, OAM) system, analysis, prediction, planning, configuration, testing, and fault management on a communication network is implemented.

Figure 2:
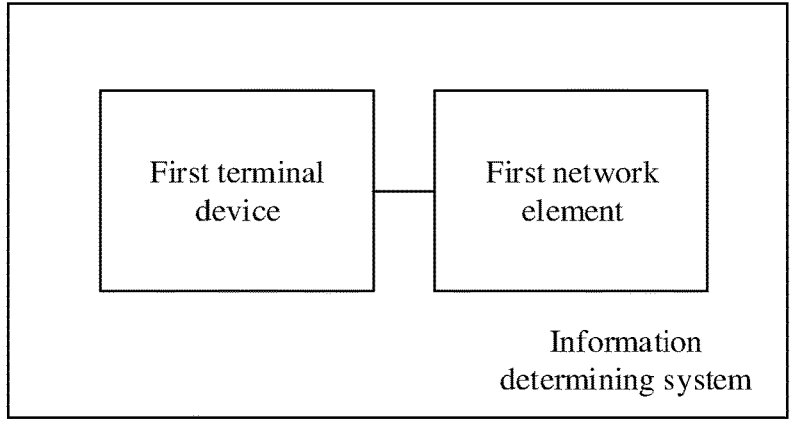
FIG. 2 is a schematic diagram of an architecture of an information determining system according to at least one embodiment.

The following describes an architecture of an optional system for implementing an information determining method provided in at least one embodiment. FIG. 2 is a schematic diagram of an architecture of an information determining system according to at least one embodiment. As shown in FIG. 2, the system includes at least a first terminal device and a first network element.

The first terminal device is the terminal device in FIG. 1 and a terminal device that has a media data transmission function and that is in any form in a future communication network. The first network element is a network element having an analysis and statistics function based on big data, artificial intelligence, or the like. For example, the first network element is an NWDAF network element in a core network.

The first terminal device sends, to the first network element, first information including first indication information. The first network element determines, based on the first indication information, a first access network device connected to the first terminal device, and obtain historical statistical information of a bandwidth between the first access network device and the first terminal device. The historical statistical information of the bandwidth includes usage information of the bandwidth between the first access network device and the first terminal device within preset historical statistical duration before a current moment. For example, the preset historical statistical duration is one hour or several hours, one day or several days, one week or several weeks, one month or several months before the current moment. In this way, the first network element determines second information based on the historical statistical information of the bandwidth between the first access network device and the first terminal device, where the second information is useable for determining a first code rate of media data of first media received by the first terminal device. The second information is bandwidth information determined by the first network element, or is code rate information. Optionally, the first network element sends the second information to the first terminal device, so that the first terminal device implements code rate selection or adjustment. Alternatively, the first network element sends the second information to a media server that is configured to send the media data of the first media to the first terminal device, so that the media server implements code rate selection or adjustment.

Based on the architecture of the system, the first network element predicts a network condition of a media data transmission link in real time based on the historical statistical information of the bandwidth between the first access network device and the first terminal device, to obtain the second information, so that the first terminal device or the media server determines, in real time based on the second information, the first code rate of the media data received by the first terminal device. Compared with a bandwidth change that is of the first terminal device and that is obtained through averaging within a time window, the historical statistical information of the bandwidth between the first access network device and the first terminal device more accurately reflects a change rule of the bandwidth between the first access network device and the first terminal device. Therefore, in a manner of at least one embodiment, accuracy and real-time performance of the code rate adjustment is ensured, and effectiveness of the code rate adjustment is improved.

The information determining method provided in embodiments of at least one embodiment is implemented in different interaction scenarios of the first terminal device, for example, a PDU session establishment scenario of the first terminal device, a PDU session modification scenario of the first terminal device, a service request (for example, a video call service request or a voice call service request) scenario of the first terminal device, and a scenario of application layer interaction between the first terminal device and an AF network element.

Further, the information determining method in embodiments of at least one embodiment is applied to a scenario in which before playing first media online, the first terminal device determines a fixed first code rate for playing the first media online. For example, for some short videos lasting for several seconds or dozens of seconds, second information is determined based on historical statistical information of a bandwidth, and the fixed first code rate for playing the short video by the first terminal device is determined based on the second information. Alternatively, the method is applied to a scenario in which in a process of playing first media, the first terminal device periodically determines a first code rate for playing the first media and further periodically adjust the code rate for playing the first media. For example, for some videos lasting for several minutes, dozens of minutes, or several hours, second information is periodically determined based on historical usage information of a bandwidth, and the code rate for playing the video by the first terminal device is adjusted in real time based on the second information. For example, a periodicity is 20 seconds or 40 seconds. The first media in embodiments of at least one embodiment includes audio type media, video type media, and the like.

Still further, in at least one embodiment, the media server processes media data based on the first code rate in the following manners. In a specific implementation, media data with different code rates of the first media is pre-stored in the media server. After the first code rate is determined, the media server transmits media data corresponding to the first code rate to the first terminal device. In another specific implementation, media data with an original code rate (usually a high code rate) of the first media is pre-stored in the media server. After the first code rate is determined, the media server encodes the media data with the original code rate based on the first code rate, and then transmits encoded media data to the first terminal device. In still another specific implementation, in some live streaming scenarios, after the first code rate is determined, the media server encodes, based on the first code rate, media data that is obtained immediately, and then transmits encoded media data to the first terminal device.

Network elements in at least one embodiment are physical network devices or virtual network devices. A connection relationship between devices in at least one embodiment is a direct connection or an indirect connection, or is a wired connection or a wireless connection. Information sending in at least one embodiment is direct sending or indirect sending through at least one device. This is not specifically limited in embodiments described herein. Media in at least one embodiment is a medium used for information transmission, for example, a piece of music or a movie. Media data of the media is a bearer file that is of the media and that is used for operations such as storage and transmission. For example, the media data is a music file of a piece of music, and operations such as decoding and decoding is performed on the music file, to play the music corresponding to the music file. For another example, the media data is a movie file of a movie, and operations such as decoding and decoding is performed on the movie file, to play the movie corresponding to the movie file.

Figure 3:
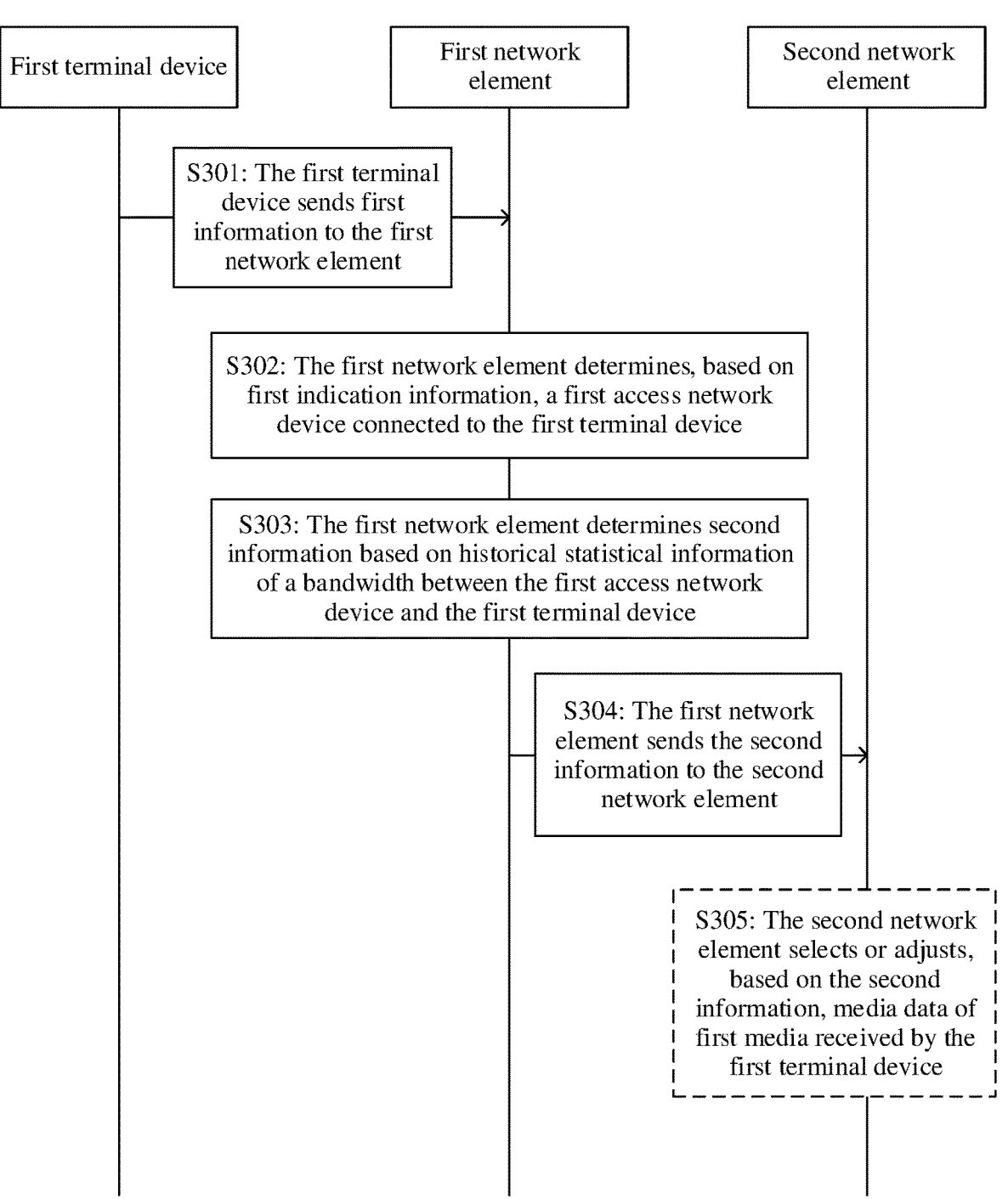
FIG. 3 is a schematic flowchart of an information determining method according to at least one embodiment.

The following describes the information determining method provided in at least one embodiment with reference to FIG. 3 to FIG. 7. FIG. 3 is a schematic flowchart of an information determining method according to at least one embodiment. Network elements in the information determining method corresponding to FIG. 3 include a first terminal device, a first network element, and a second network element. In an optional case, the second network element and the first terminal device is a same device. In another optional case, the second network element is a media server. The first terminal device corresponds to the descriptions of the first terminal device in the architecture of the system in FIG. 2, the first network element corresponds to the descriptions of the first network element in the architecture of the system in FIG. 2, and the media server is configured to send media data of first media to the first terminal device. As shown in FIG. 3, the method includes at least steps S301 to S304.

S301: The first terminal device sends first information to the first network element.

The first information includes first indication information, and the first indication information is useable for determining a first access network device connected to the first terminal device. Specifically, the first indication information includes first location information of the first terminal device and/or an identifier of the first access network device. For example, the first location information is global positioning system (Global Positioning System, GPS) information of the first terminal device. The identifier of the first access network device is an access network identifier ((R)AN ID) of the first access network device, a cell identifier (cell ID) corresponding to any cell of the first access network device, or the like.

Optionally, the first information further includes first period indication information, and the first period indication information indicates a period within which the first terminal device receives the media data of the first media.

Optionally, the first information further includes second indication information, and the second indication information indicates a first user plane network element corresponding to the first terminal device. The first user plane network element includes one or more network elements, for example, an anchor UPF network element, that are in a core network and that provide any one of the following functions for the first terminal device: data packet routing, serving as a mobility anchor, serving as an uplink classifier, serving as a branch point, or the like.

Optionally, the first information includes one or more of the following information: a media identifier, an optional code rate, or state information of the first media.

The first media is media requested by the first terminal device. In an implementation, the media identifier of the first media indicates a media type of the first media. Optionally, the media type of the first media is either an audio type or a video type. For example, some music players have a random listening function, that is, the first terminal device requests to play music, but does not specify a piece of to-be-played music. In this scenario, the media identifier of the first media indicates the audio type. In another implementation, the media identifier of the first media indicates media data of specific media that the first terminal device requests to transmit. For example, the media identifier of the first media indicates a song, a movie, an episode of a TV series, or the like.

The first media includes one piece of media data. For example, the first media is a piece of music, and the music includes a music file with a code rate of 0.5 Mbps. Alternatively, the first media includes a plurality of pieces of media data with different code rates. For example, the first media is first music, and the first music includes three music files: a lossless-sound-quality file with a code rate of 0.5 Mbps, a normal-sound-quality file with a code rate of 0.1 Mbps, and a fluent-sound-quality file with a code rate of 0.05 Mbps.

Correspondingly, there is one optional code rate, and the optional code rate indicates a code rate of one piece of media data of the first media. For example, in response to there being only one piece of media data of the first media, the optional code rate is a code rate corresponding to the media data. For another example, in response to there being a plurality of pieces of media data of the first media, the optional code rate is a code rate corresponding to any piece of media data of the first media. In the foregoing example of the first music, the optional code rate is any one of 0.5 Mbps, 0.1 Mbps, or 0.05 Mbps. Alternatively, there is a plurality of optional code rates, and the plurality of optional code rates indicates respective code rates of a plurality of pieces of media data of the first media. In the foregoing example of the first music, the optional code rates is 0.5 Mbps, 0.1 Mbps, and 0.05 Mbps.

The state information indicates a state of the media data of the first media buffered by the first terminal device. For example, the state information is a size of the media data of the first media that has been buffered but has not been played by the first terminal device, for example, 10 M. For another example, the state information is playing duration of the media data of the first media that has been buffered but has not been played by the first terminal device, for example, 30 s.

Optionally, the first information further includes an identifier of the first terminal device. The identifier of the first terminal device is a temporary mobile subscriber identity (Temporary Mobile Subscriber Identity, TMSI), an international mobile subscriber identity (International Mobile Subscriber Identity, a radio network temporary identifier (Radio Network Temporary Identifier, RNTI), or the like of the first terminal device.

The first information sent by the first terminal device is directly sent to the first network element, or is sent to the first network element through another network element. The first information is sent to the first network element via a same message entity, or is sent to the first network element via different message entities. The following uses a case in which the first network element is an NWDAF network element as an example to describe two optional transmission manners.

In a first transmission manner, the first terminal device sends the first information to the NWDAF network element through an SMF network element. For example, the first terminal device sends the first information to the SMF network element via a PDU session establishment request. The SMF network element obtains the first information from the PDU session establishment request, and sends, to the NWDAF network element, a first prediction request that carries the first information.

In a second transmission manner, the first terminal device sends the first information to the NWDAF network element through an AF network element (where the AF network element is a media server that integrates functions of managing or storing the media data of the first media, or the like). For example, the first terminal device sends, to the AF, a code rate adjustment request that carries the first information. After obtaining the first information from the code rate adjustment request, the AF network element sends, to the NWDAF network element, a second prediction request that carries the first information. Further, in response to the first information including the media identifier of the first media but not including the optional code rate of the first media, the AF network element includes the optional code rate of the first media in the first information, and send, via the second prediction request, the first information including the optional code rate.

S302: The first network element determines, based on the first indication information, the first access network device connected to the first terminal device.

For example, after receiving the first information, the first network element obtains the first indication information from the first information, and further determines the first access network device based on the first indication information. The first indication information includes the first location information of the first terminal device and/or the identifier of the first access network device. The first network element determines the first access network device based on either the first location information or the identifier of the first access network device. In response to the first indication information including the first location information and the identifier of the first access network device, the first network element determines the first access network device based on both the first location information and the identifier of the first access network device.

In response to the first indication information including the first location information of the first terminal device, the first network element determines, based on a correspondence between each access network device and a geographic location covered by a cell of each access network device in a communication network, that a geographic location indicated by the first location information of the first terminal device is a geographic location covered by a cell of the first access network device. Optionally, the correspondence between each access network device and a geographical location covered by a cell of each access network device in a communication network is obtained by the first network element from an OAM system.

In response to the first indication information including the identifier of the first access network device connected to the first terminal device, where for example, the identifier of the first access network device is the (R)AN ID, and the (R)AN ID is a unique identifier of the access network device, the first network element determines the first access network device based on the (R)AN ID included in the first indication information. For another example, the identifier of the first access network device is the cell ID. The first network element determines, based on a correspondence between each access network device and a cell ID of a cell of each access network device in a communication network, that the cell ID included in the first indication information is a cell ID corresponding to a cell of the first access network device. Optionally, the correspondence between each access network device and a cell ID of a cell of each access network device in a communication network is obtained by the first network element from an OAM system.

In response to the first indication information including the first location information and the identifier of the first access network device, the first network element determines one access network device based on the first location information, and determine one access network device based on the identifier of the first access network device. In response to the access network devices determined in the two manners being a same access network device, the device is determined as the first access network device. In response to the access network devices determined in the two manners being different access network devices, the access network device determined based on the identifier (for example, the (R)AN ID or the cell ID) of the first access network device is determined as the first access network device. This avoids a problem that determining of the first access network device is inaccurate because the first location information reported by the first terminal device is inaccurate, and avoids a problem that determining of the first access network device is inaccurate because an access network device actually connected to the first terminal device is different from an access network device corresponding to a geographical location recorded in an OAM system in response to the first terminal device being located at a boundary or an overlapping location of two cells.

S303: The first network element determines second information based on historical statistical information of a bandwidth between the first access network device and the first terminal device.

After the first access network device is determined, the first network element obtains the historical statistical information of the bandwidth between the first access network device and the first terminal device, to determine the second information. For example, the first network element obtains the historical statistical information of the bandwidth between the first access network device and the first terminal device from a network management network element (for example, the OAM system). For example, the first network element obtains the identifier of the first terminal device, and send the identifier of the first access network device and the identifier of the first terminal device to the network management network element (for example, the OAM system). The network management network element obtains, based on the identifier of the first access network device and the identifier of the first terminal device, the historical statistical information of the bandwidth between the first access network device and the first terminal device from historical statistical information that is of bandwidths between different access network devices and terminal devices and that is recorded in network operation and maintenance, and returns the historical statistical information to the first network element.

The historical statistical information of the bandwidth between the first access network device and the first terminal device indicates usage information of the bandwidth between the first access network device and the first terminal device within preset historical statistical duration before a current moment. For example, the preset historical statistical duration is one hour or several hours, one day or several days, one week or several weeks, one month or several months before the current moment.

In an implementation, the historical statistical information of the bandwidth between the first access network device and the first terminal device includes a usage record of the bandwidth between the first access network device and the first terminal device within the preset historical statistical duration, for example, include an instantaneous used bandwidth between the first access network device and the first terminal device at each moment within the preset historical statistical duration. In another implementation, the historical statistical information of the bandwidth between the first access network device and the first terminal device includes information obtained by performing statistical analysis on a usage record of the bandwidth between the first access network device and the first terminal device within the preset historical statistical duration. For example, a waveform diagram is useable for reflecting the instantaneous used bandwidth between the first access network device and the first terminal device at each moment within the preset historical statistical duration. In response to some burr or sawtooth phenomena occurring in the waveform diagram, smoothing processing is performed on the instantaneous used bandwidth between the first access network device and the first terminal device at each moment within the preset historical statistical duration. The smoothing processing is processing through high-frequency component filtering or the like by using a filter, to obtain a waveform diagram without a burr or a sawtooth. An instantaneous used bandwidth that is between the first access network device and the first terminal device and that is reflected in the processed waveform diagram is determined as the historical statistical information of the bandwidth between the first access network device and the first terminal device.

After obtaining the historical statistical information of the bandwidth between the first access network device and the first terminal device, the first network element predicts, based on the historical statistical information of the bandwidth between the first access network device and the first terminal device, a link for transmitting the media data of the first media between the first access network device and the first terminal device, to obtain the second information.

For the second information, in an optional case, the second information includes information about a first bandwidth, and the information about the first bandwidth is information about a bandwidth obtained by the first network element by performing bandwidth prediction on the link for transmitting the media data of the first media between the first access network device and the first terminal device. In another optional case, the second information includes a recommended code rate. The recommended code rate is a recommended code rate that is of the media data of the transmitted first media and that is determined based on the information about the first bandwidth obtained by the first network element by performing bandwidth prediction on the link for transmitting the media data of the first media between the first access network device and the first terminal device.

In a process in which the first network element determines the recommended code rate based on the information about the first bandwidth, in response to the first information including the optional code rate, the first network element determines the recommended code rate based on the optional code rate in the first information. For example, in response to there being only one optional code rate in the first information, and the optional code rate matches the information about the first bandwidth, the optional code rate is determined as the recommended code rate. For another example, in response to there being a plurality of optional code rates in the first information, the first network element selects, from the plurality of optional code rates, an optimal code rate that matches the information about the first bandwidth as the recommended code rate. In response to the first information not including the optional code rate, the first network element determines an optimal code rate that matches the information about the first bandwidth as the recommended code rate. For example, the information about the first bandwidth is 5 Mbps. In response to the first information not including the optional code rate, an optimal code rate of 2.5 Mbps that matches the information about the first bandwidth of 5 Mbps is determined as the recommended code rate. In response to the optional code rates included in the first information being 1.5 Mbps, 8 Mbps, 10 Mbps, and 20 Mbps, 1.5 Mbps is determined as the recommended code rate.

A manner of determining the optimal code rate that matches the information about the first bandwidth is not limited. A code rate of media data is usually variable, that is, code rates of media data of different media segments of same media is different. Therefore, to ensure smooth transmission of the media data, a particular redundant bandwidth is used reserved on a basis of an average code rate of the media data, to cope with sudden changes in the code rates of the media data of the different media segments. In an implementation, media of different media service types correspond to different degrees of code rate sudden changes. Therefore, the optimal code rate matching the information about the first bandwidth is determined based on a media service type of the first media. For example, in response to the bandwidth and the code rate being measured in a same measurement unit (for example, Mbps), for a media service of a short video type, a ratio of the information about the first bandwidth to the optimal code rate is one value in an interval [4,4.5]; for a media service of a normal video type, a ratio of the information about the first bandwidth to the optimal code rate is one value in an interval [1.5,2]; and the like. For ease of description, in the following examples, a relationship that the ratio of the information about the first bandwidth to the optimal code rate is 2 is used as an example.

In response to the first information including the state information, and the second information including the recommended code rate, in a process of determining the recommended code rate, the first network element performs determining based on the state information in the first information, namely, the state of the data of the first media buffered by the first terminal device. For example, the state information in the first information indicates remaining playing duration of the media data of the first media buffered by the first terminal device, where the remaining playing duration is duration for which the first terminal device still plays the media data of the buffered first media. Further, the recommended code rate is selected from the optional code rates of the first media based on the remaining playing duration. For example, in response to the remaining playing duration reaching a first time threshold, the first network element determines, in the optional code rates of the first media, a lowest optional code rate that is higher than the optimal code rate matching the information about the first bandwidth as the recommended code rate. In response to the remaining playing duration reaching a second time threshold, the first network element determines, in the optional code rates of the first media, a second-lowest optional code rate that is higher than the optimal code rate matching the information about the first bandwidth (where there is another optional code rate between the second-lowest optional code rate and the optimal code rate matching the bandwidth corresponding to the information about the first bandwidth; for example, the second-lowest optional code rate is 10 Mbps, the optimal code rate matching the information about the first bandwidth is 5 Mbps, and there is another optional code rate of 8 Mbps between the two code rates) as the recommended code rate.

Optionally, the first network element determines a first period within which the first terminal device receives the media data of the first media. A process in which the first network element determines the second information is prediction performed on the link between the first access network device and the first terminal device within the first period within which the first terminal device receives the media data of the first media. The first period is a period between two moments within one analysis periodicity (for example, one day). In response to predicting the link within the first period, the first network element obtains historical statistical information of a bandwidth within a historical period corresponding to the first period of the preset historical statistical duration (where for example, the preset historical statistical duration is a month before a current day, the first period is between 9:00 and 9:30 on the current day, and the historical period corresponding to the first period is between 9:00 and 9:30 on each day within the month before the current day). Further, the first network element predicts the link between the first access network device and the first terminal device within the first period based on the historical statistical information of the bandwidth within the historical period, to obtain the second information. Based on the historical statistical information of the bandwidth within the historical period corresponding to the first period, the first network element more accurately predicts a network condition of the link between the first access network device and the first terminal device within the first period, and further more accurately determine the second information for the first media.

For a manner of determining the first period within which the first terminal device receives the media data of the first media, in response to the first information including the first period indication information, the first network element determines the first period based on the first period indication information. In response to the first information not including the first period indication information, the first network element determines, as the first period within which the first terminal device receives the media data of the first media, a time window that is with preset duration and that is after the receiving of the first information of the first terminal device. For example, in a scenario in which the code rate of the first media is periodically adjusted, in response to the first network element receiving the first information of the first terminal device at a moment 1, the first network element determines, as the first period, a time window whose duration is 10 s and that is after the moment 1.

Further, second information corresponding to different periods within the first period is different. In this case, the second information includes different second information corresponding to different periods within the first period and period indication information corresponding to each period within the first period.

In a specific implementation of determining the second information, a prediction model is established in the first network element, the historical statistical information of the bandwidth between the first access network device and the first terminal device is input to the prediction model, and the prediction model outputs the second information. Based on different prediction models established in the first network element, the first network element determines the second information in different manners. The following describes several alternative manners of determining the second information.

In a first alternative determining manner, the first network element determines feature information of the bandwidth between the first access network device and the first terminal device based on the historical statistical information of the bandwidth between the first access network device and the first terminal device, and then determine the second information based on the feature information of the bandwidth. The feature information of the bandwidth between the first access network device and the first terminal device is obtained based on one or more of the following statistical analysis manners: average value statistical analysis, variance statistical analysis, mean square error statistical analysis, bandwidth change rate statistical analysis, regression analysis, covariance analysis, or the like of the bandwidth. A specific statistical analysis manner is not limited herein.

Optionally, the feature information of the bandwidth indicates change features of bandwidths that are between the first terminal device and the first access network device and that correspond to different periods, so that the first network element determines the second information based on feature information of the bandwidths corresponding to the different periods. For example, the first network element obtains, from information about the change features of the bandwidths, feature information of a bandwidth corresponding to a current period, and then determine the second information based on the feature information of the bandwidth corresponding to the current period. For another example, the first network element determines the first period within which the first terminal device receives the media data of the first media, obtain, from the feature information of the bandwidth, feature information of a bandwidth corresponding to the first period, and determine the second information based on the feature information of the bandwidth corresponding to the first period.

For example, the historical statistical information of the bandwidth between the first access network device and the first terminal device includes the usage record of the bandwidth between the first access network device and the first terminal device. The first network element determines that within 24 hours of a day, the feature information of the bandwidth between the first access network device and the first terminal device is: An occupied average bandwidth between 00:00 and 08:00 is 0.1 Mbps, an occupied average bandwidth between 08:00 and 12:00 is 5 Mbps, an occupied average bandwidth between 12:00 and 14:00 is 10 Mbps, an occupied average bandwidth between 14:00 and 17:00 is 5 Mbps, an occupied average bandwidth between 17:00 and 20:00 is 0.1 Mbps, and an occupied average bandwidth between 20:00 and 24:00 is 10 Mbps. In response to the first period within which the first terminal device receiving the media data of the first media is between 21:40 and 22:00, the feature information of the bandwidth corresponding to the first period is that the occupied average bandwidth is 10 Mbps. The first network element determines the second information based on the occupied average bandwidth of 10 Mbps.

In a second alternative determining manner, the first network element obtains a maximum available bandwidth of the first access network device and historical usage information of the bandwidth between the first access network device and the terminal device based on the first indication information, and further determine the second information based on the maximum available bandwidth of the first access network device, the historical usage information of the bandwidth, and the historical statistical information of the bandwidth between the first access network device and the first terminal device. The maximum available bandwidth of the first access network device is a total bandwidth of an available radio channel configured for the first access network device. The historical usage information of the bandwidth between the first access network device and the terminal device includes historical statistical information of a bandwidth occupied by the terminal device on a radio channel of the first access network device within the preset historical statistical duration. Optionally, the foregoing two types of information is obtained by the first network element from the network management network element.

Specifically, the first network element predicts, based on the maximum available bandwidth of the first access network device and the historical usage information of the bandwidth between the first access network device and the terminal device, an available bandwidth that is not occupied by the terminal device on the radio channel of the first access network device, and further determine the second information based on the available bandwidth of the first access network device and the historical statistical information of the bandwidth between the first access network device and the first terminal device.

For example, an assumption is able to be made that the maximum available bandwidth of the first access network device is 10 Mbps, and the historical usage information of the bandwidth between the first access network device and the terminal device is: An occupied bandwidth between 00:00 and 08:00 is 0.5 Mbps, an occupied bandwidth between 08:00 and 12:00 is 8 Mbps, and an occupied bandwidth between 12:00 and 24:00 is 9 Mbps. The first network element subtracts each bandwidth corresponding to the historical usage information of the bandwidth between the first access network device and the terminal device from the maximum available bandwidth of the first access network device, to obtain the available bandwidth of the first access network device. An available bandwidth between 00:00 and 08:00 is 9.5 Mbps, an available bandwidth between 08:00 and 12:00 is 2 Mbps, and an available bandwidth between 12:00 and 24:00 is 1 Mbps. The first network element further determines, based on the historical statistical information of the bandwidth between the first access network device and the first terminal device, that an average bandwidth between the first access network device and the first terminal device between 00:00 and 08:00 is 0.5 Mbps, an average bandwidth between 08:00 and 12:00 is 1 Mbps, an average bandwidth between 12:00 and 22:00 is 5 Mbps, and an average bandwidth between 22:00 and 24:00 is 1 Mbps. In this way, the first network element adds the average bandwidth between the first access network device and the first terminal device and the available bandwidth of the first access network device, to predict a bandwidth that is allocated by the first access network device to the first terminal device. To be specific, an available bandwidth of the first terminal device between 00:00 and 08:00 is 10 Mbps, an available bandwidth between 08:00 and 12:00 is 3 Mbps, an available bandwidth between 12:00 and 22:00 is 6 Mbps, and an available bandwidth between 22:00 and 24:00 is 1 Mbps. Further, the first network element determines the second information based on the predicted bandwidth that is allocated by the first access network device to the first terminal device.

In a third alternative determining manner, the historical statistical information of the bandwidth between the first access network device and the first terminal device includes the instantaneous used bandwidth between the first access network device and the first terminal device at each moment within the preset historical statistical duration. Based on the prediction model, the first network element predicts an instantaneous available bandwidth between the first access network device and the first terminal device at each moment within one analysis periodicity (for example, one day) based on the instantaneous used bandwidth at each moment within the preset historical statistical duration, and further determine the second information based on the instantaneous available bandwidth. Specifically, the second information is determined based on an instantaneous available bandwidth corresponding to a current moment, or the second information is determined based on an instantaneous available bandwidth corresponding to the first period within which the first terminal device receives the media data of the first media.

Because the instantaneous used bandwidth at each moment within the preset historical statistical duration usually changes with time, an instantaneous used bandwidth sudden change occurs at some moments within the preset historical statistical duration. In this case, the first network element determines, based on the instantaneous used bandwidth at each moment, bandwidth stabilization duration corresponding to a moment at which the bandwidth sudden change occurs, and determine, as a short-time bandwidth sudden change period, a bandwidth sudden change period whose bandwidth stabilization duration does not exceed a preset duration threshold. Further, weakening processing (for example, ignoring or eliminating processing) is performed on an instantaneous used bandwidth corresponding to the short-time bandwidth sudden change period, to determine an instantaneous available bandwidth within one analysis periodicity based on an instantaneous used bandwidth at each moment obtained through the weakening processing.

Optionally, the second information further includes short-time bandwidth sudden change indication information corresponding to the short-time bandwidth sudden change period, and the indication information indicates the first terminal device not to switch a code rate within the short-time bandwidth sudden change period. This avoids a problem of unstable media playing because the first terminal device frequently switches between media code rates in response to the bandwidth sudden change frequently occurring within the short-time bandwidth sudden change period.

Figure 4:
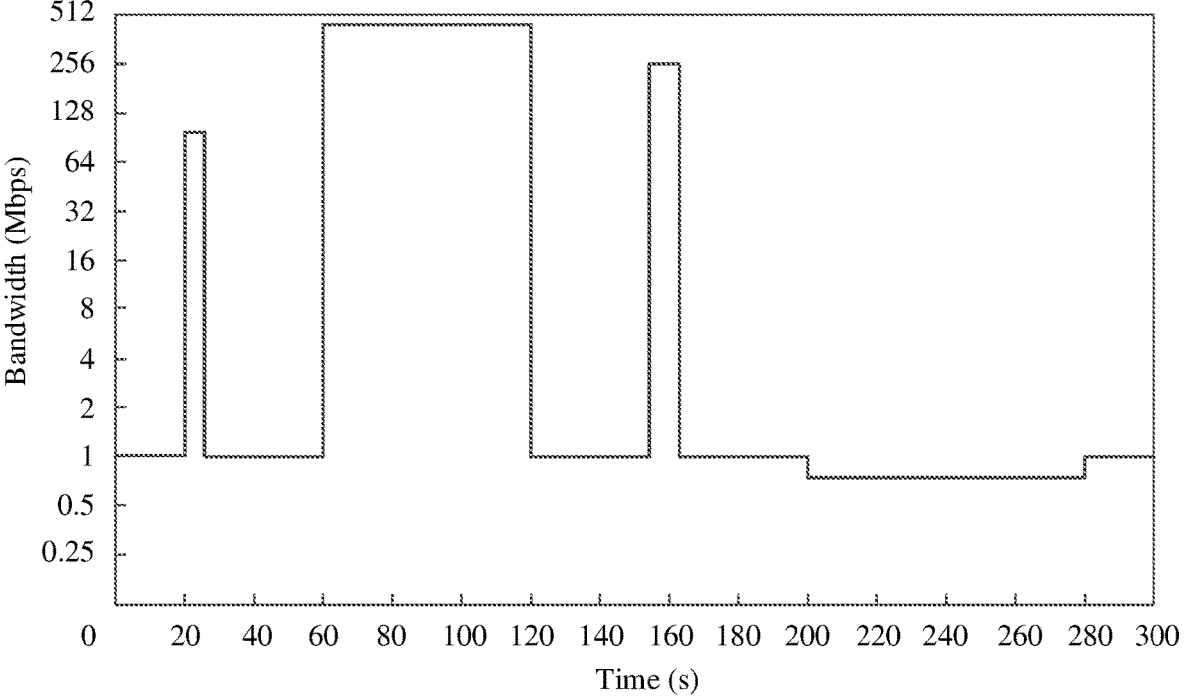
FIG. 4 is a schematic diagram of a waveform of an instantaneous used bandwidth according to at least one embodiment.

With reference to FIG. 4, the foregoing third alternative determining manner is used as an example. FIG. 4 is a schematic diagram of a waveform of an instantaneous used bandwidth according to at least one embodiment. The waveform diagram in FIG. 4 reflects the instantaneous used bandwidth between the first access network device and the first terminal device within a period of 300 consecutive seconds of the preset historical statistical duration, and a preset duration threshold is 10 s. As shown in FIG. 4, in response to the first period within which the media data of the first media being transmitted corresponds to a period between 0 s and 60 s in FIG. 4 (where for example, the first period and the period between 0 s and 60 s in FIG. 4 each are a period between 10:00 and 10:01), the instantaneous used bandwidth suddenly changes at 20 s, an available bandwidth suddenly changes from 1 Mbps to 100 Mbps, and bandwidth stabilization duration within which the instantaneous used bandwidth is maintained at 100 Mbps does not exceed the preset duration threshold of 10 s, an instantaneous used bandwidth sudden change that occurs at 20 s is ignored, and 1 Mbps is used as the instantaneous used bandwidth at each moment between 20 s and 23 s. In response to the second information determined based on the prediction model including the information about the first bandwidth, 1 Mbps is determined as the information about the first bandwidth, and further the second information is determined based on the information about the first bandwidth of 1 Mbps. In response to the second information determined based on the prediction model including the recommended code rate, after 1 Mbps is determined as the information about the first bandwidth, the second information is determined based on the recommended code rate of 0.5 Mbps corresponding to 1 Mbps.

In this example, optionally, the second information further includes short-time bandwidth sudden change indication information for the period between 20 s and 23 s, and the indication information indicates that for the bandwidth sudden change that occurs between 20 s and 23 s and whose bandwidth stabilization duration does not exceed the preset duration threshold, a code rate is to be kept unchanged, and a media code rate switchover is not to be performed.

As shown in FIG. 4, in response to the first period within which the media data of the first media being transmitted corresponds to a period between 60 s and 120 s in FIG. 4, an available bandwidth suddenly changes at 60 s, the available bandwidth suddenly changes from 1 Mbps to 500 Mbps, and bandwidth stabilization duration within which the available bandwidth is maintained at 500 Mbps is 60 s, which exceeds the preset duration threshold of 10 s, weakening processing is not performed on the instantaneous used bandwidth between 60 s and 120 s, and 500 Mbps is used as the instantaneous used bandwidth at each moment between 60 s and 120 s. In response to the second information determined based on the prediction model including the information about the first bandwidth, 500 Mbps is determined as the information about the first bandwidth, and further the second information is determined based on the information about the first bandwidth of 500 Mbps. In response to the second information determined based on the prediction model including the recommended code rate, after 500 Mbps is determined as the information about the first bandwidth, the second information is determined based on the recommended code rate of 250 Mbps corresponding to 500 Mbps.

Likewise, as shown in FIG. 4, in response to the first period corresponding to a period between 120 s and 180 s in FIG. 4 (where an available bandwidth sudden change whose bandwidth stabilization duration is less than 10 s occurs between 155 s and 163 s), the instantaneous used bandwidth at each moment between 120 s and 180 s is determined as 1 Mbps. In response to the second information determined based on the prediction model including the information about the first bandwidth, 1 Mbps is determined as the information about the first bandwidth included in the second information, and the second information is determined based on the information about the first bandwidth of 1 Mbps. In response to the second information determined based on the prediction model including the recommended code rate, 0.5 Mbps is determined as the recommended code rate included in the second information. In an optional manner, the second information includes short-time bandwidth sudden change indication information, indicating that media code rate switching is not to be performed for the bandwidth sudden change between 155 s and 163 s.

As shown in FIG. 4, in response to the first period (assuming that the first period is between 9:00 and 9:02) within which the media data of the first media being transmitted corresponds to a period between 180 s and 300 s in FIG. 4, because an available bandwidth sudden change whose bandwidth stabilization duration is 80 s and that changes from 1 Mbps to 0.7 Mbps occurs at 200 s, and an available bandwidth sudden change whose bandwidth stabilization duration is 20 s and that changes from 0.7 Mbps to 1 Mbps occurs at 280 s, 1 Mbps is determined as the instantaneous used bandwidth between 180 s and 200 s, 0.7 Mbps is determined as the instantaneous used bandwidth between 200 s and 280 s, and 1 Mbps is determined as the instantaneous used bandwidth between 280 s and 300 s. Further, in response to the second information determined based on the prediction model including the information about the first bandwidth, 1 Mbps is determined as the information about the first bandwidth between 09:00 and 09:00:20 that is included in the second information, 0.7 Mbps is determined as the information about the first bandwidth between 09:00:20 and 09:01:40, and 1 Mbps is determined as the information about the first bandwidth between 09:01:40 and 09:02. In response to the second information determined based on the prediction model including the recommended code rate, 0.5 Mbps is determined as the recommended code rate between 09:00 and 09:00:20 that is included in the second information, 0.35 Kb/s is determined as the recommended code rate between 09:00:20 and 09:01:40, and 0.5 Mbps is determined as the recommended code rate between 09:01:40 and 09:02.

In the foregoing three alternative determining manners, only a case in which the first terminal device transmits the media data is considered. In actual use, there is a scenario in which a plurality of terminal devices served by the first access network device connected to the first terminal device is to transmit media data. Based on this scenario, in a fourth alternative implementation, before step S303, the first network element further obtains an identifier of a second terminal device. The second terminal device is a terminal device that receives media data of second media through the first access network device, and there is one or more second terminal devices. For example, the second terminal device is a terminal device that performs a voice call, a terminal device that performs a video call, a terminal device that listens to music online, a terminal device that watches a video online, or the like in terminal devices connected to the first access network device. Further, in a process of determining the second information, the first network element determines the second information based on the identifier of the second terminal device and the historical statistical information of the bandwidth between the first access network device and the first terminal device. Still further, the first network element obtains third information of the second terminal device based on the identifier of the second terminal device, to determine the second information based on the third information of the second terminal device and the first information of the first terminal device. The second media and the first media is same media different media.

The third information of the second terminal device includes one or more of the following information: an optional code rate of the second media, information about a state of the media data of the second media buffered by the second terminal device, third indication information, and second period indication information. The third indication information indicates a second user plane network element corresponding to the second terminal device, and the second period indication information indicates a period within which the second terminal device receives the media data of the second media.

The third information of the second terminal device is reported by the second terminal device in response to the second terminal device requesting adaptive code rate adjustment. A type of the information included in the third information of the second terminal device is the same as a type of the information included in the first information of the first terminal device.

In a process of determining the second information based on the third information of the second terminal device and the historical statistical information of the bandwidth between the first access network device and the first terminal device, the first network element determines the second information based on different determining models, to ensure that the first terminal device and each second terminal device appropriately and fairly occupy a shared bandwidth of the first access network device, so as to ensure smooth media transmission of each second terminal device and effectiveness of bandwidth utilization of the first access network device. With reference to two optional implementations, the following describes two example implementations of determining the second information based on the third information of the second terminal device and the historical statistical information of the bandwidth between the first access network device and the first terminal device.

In a first example implementation, the first information of the first terminal device includes at least two optional code rates of the first media, the third information of the second terminal device includes at least two optional code rates of the second media, and the second media is media corresponding to media data received by the second terminal device. The first network element obtains historical statistical information of a bandwidth between the second terminal device and the first access network device, and the first network element predicts the available bandwidth of the first access network device based on the historical statistical information of the bandwidth between the first access network device and the first terminal device and the historical statistical information of the bandwidth between the second terminal device and the first access network device, so that the available bandwidth is evenly allocated to the first terminal device and each second terminal device, and the first terminal device and each second terminal device fairly occupy the radio bandwidth of the first access network device. In this way, the first network element separately selects a recommended code rate for the first terminal device and each second terminal device from respective corresponding optional code rates based on the evenly allocated bandwidth, and determines the second information based on the recommended code rate. The available bandwidth of the first access network device is evenly allocated, so that media transmission quality of each terminal device served by the first access network device is considered.

For example, the optional code rates corresponding to the first media are 10 Mbps, 150 Mbps, and 800 Mbps. There is only one second terminal device. The optional code rates corresponding to the second media are 10 Mbps, 100 Mbps, and 500 Mbps. In response to the available bandwidth of the first access network device being 500 Mbps, the first network element evenly allocates the bandwidth of 500 Mbps to the first terminal device and the second terminal device, that is, each terminal device occupies a bandwidth of 250 Mbps. Further, the first network element determines 150 Mbps as the recommended code rate of the first terminal device and determines 100 Mbps as the recommended code rate of the second terminal device based on the bandwidth of 250 Mbps allocated to each terminal device.

In a second example implementation, the first information of the first terminal device includes at least two optional code rates of the first media, the third information of the second terminal device includes at least two optional code rates of the second media, and the second media is media corresponding to media data received by the second terminal device. The first network element obtains historical statistical information of a bandwidth between the second terminal device and the first access network device, predicts the available bandwidth of the first access network device based on the historical statistical information of the bandwidth between the first access network device and the first terminal device and the historical statistical information of the bandwidth between the second terminal device and the first access network device, and determines an average available bandwidth for the first terminal device and each second terminal device based on the available bandwidth of the first access network device. Further, the first network element determines, based on the average available bandwidth in the optional code rates of the second terminal device, a maximum code rate for transmission, subtract a bandwidth occupied in response to the second terminal device transmitting the media data based on the maximum code rate from the average available bandwidth, to obtain a differential bandwidth, determine a sum of the differential bandwidth of each second terminal device and the average available bandwidth as an available bandwidth of the first terminal device, determine a recommended code rate of the first terminal device based on the available bandwidth of the first terminal device, and determine the second information based on the recommended code rate. The available bandwidth is allocated based on the optional code rates of each terminal device, and the recommended code rate is determined, to further improve efficiency of bandwidth utilization of the first access network device.

For example, the optional code rates corresponding to the first media are 10 Mbps, 180 Mbps, and 500 Mbps. There are two second terminal devices. The two second terminal devices each correspond to three optional code rates of the second media, which are respectively 2 Mbps, 80 Mbps, and 200 Mbps, and 1 Mbps, 20 Mbps, and 200 Mbps. The available bandwidth that is of the first access network device and that is determined by the first network element based on the historical statistical information of the bandwidth between the first access network device and the first terminal device and the historical statistical information of the bandwidth between the second terminal device and the first access network device is 500 Mbps. The average available bandwidth for the first terminal device and the two second terminal devices is 500 Mbps/3≈166.7 Mbps. Optimal code rates for transmission of the media data that are of the two second terminal devices and that are determined based on the average available bandwidth are respectively 80 Mbps and 20 Mbps. Bandwidths occupied in response to the media data being transmitted based on the optimal code rates are respectively 160 Mbps and 40 Mbps. Further, differential bandwidths corresponding to the two second terminal devices are respectively 6.7 Mbps and 126.7 Mbps. Therefore, an available bandwidth of the first terminal device is 6.7 Mbps+126.7 Mbps+166.7 Mbps=300.1 Mbps. Based on the available bandwidth of 300.1 Mbps of the first terminal device, a recommended code rate of the first terminal device is determined as 180 Mbps from the optional code rates of the first media. In a manner of allocating the bandwidth evenly, only a bandwidth of 166.7 Mbps is allocated to the first terminal device, and consequently a recommended code rate determined from the optional code rates of the first terminal device is 10 Mbps. However, the recommended code rate of the first terminal device obtained in the second optional implementation is increased to 180 Mbps. This not only considers media transmission quality of another second terminal device, but also improves bandwidth utilization of the first access network device.

The identifier of the second terminal device is obtained by the first network element from the SMF network element or the AF network element. In an implementation of obtaining the identifier of the second terminal device, the SMF network element sends an identifier reporting request of the second terminal device to the first user plane network element (which is the UPF network element in the core network) corresponding to the first terminal device. For example, the SMF network element sends the identifier reporting request via an N4 session modification request message, and the identifier reporting request includes the identifier of the first access network device. Optionally, the identifier reporting request further includes media service detection information, indicating the first user plane network element to determine a terminal device that transmits media data. For example, the terminal device that transmits the media data is a terminal device whose data transmission port is a specified port of the first user plane network element or whose data destination address is a specified IP address. The terminal device is connected to a user plane network element through an access network device, and the user plane network element routes data of each terminal device in the terminal devices. Therefore, the first user plane network element determines, based on the identifier of the first access network device, terminal devices connected to the first access network device together with the first terminal device, and further determines, based on the media service detection information, the second terminal device that transmits the media data. Further, the first user plane network element sends the identifier of the second terminal device to the first network element.

In another implementation of obtaining the identifier of the second terminal device, the AF network element interacts with a plurality of different terminal devices. These terminal devices interact with the AF network element to implement different services. For example, some terminal devices interact with the AF network element to complete a request for media data. For another example, some terminal devices interact with the AF network element to complete registration of a media service account of the AF network element. In a process of interaction between the AF network element and the plurality of different terminal devices, the AF network element receives, from the plurality of different terminal devices, an identifier of an access network device connected to each terminal device and service type information (where for example, the service type information is any one of a media request, account registration, account login, or media collection) of each terminal device. The AF network element obtains, from terminal devices connected to the first access network device together with the first terminal device based on the service type information of each terminal device, the second terminal device that transmits the media data (where for example, a terminal device whose service type information is the media request is the second terminal device), and sends the identifier of the second terminal device to the first network element.

In all the foregoing four alternative implementations, the first network element determines the second information based on the historical statistical information of the bandwidth between the first access network device and the first terminal device. Optionally, in response to the first information including the second indication information indicating the first user plane network element, the first network element determines the second information based on the historical statistical information of the bandwidth between the first access network device and the first terminal device and the historical statistical information of the bandwidth between the first access network device and the first user plane network element. Specifically, the first network element predicts, based on the historical statistical information of the bandwidth between the first access network device and the first terminal device, a first available bandwidth between the first access network device and the first terminal device in response to the first terminal device receiving the media data of the first media, and predict, based on the historical statistical information of the bandwidth between the first access network device and the first user plane network element, a second available bandwidth between the first access network device and the first user plane network element In response to the first terminal device receiving the media data of the first media. In an implementation, the first network element determines the second information (which includes the information about the first bandwidth or the recommended code rate) based on a smaller bandwidth in the first available bandwidth and the second available bandwidth. In another implementation, the first network element determines first recommended information based on the first available bandwidth, determine second recommended information based on the second available bandwidth, and determine, as the second information, smaller recommended information in the first recommended information and the second recommended information. In the latter implementation, the first recommended information and the second recommended information are of a same type. For example, both the first recommended information and the second recommended information include the recommended code rates, or both the first recommended information and the second recommended information include the information about the first bandwidth.

For a specific implementation in which the first network element determines the first available bandwidth or the first recommended information based on the historical statistical information of the bandwidth between the first access network device and the first terminal device, refer to the manner of determining the second information in the first to the third alternative implementations. Details are not described herein again. For a specific implementation in which the first network element determines the second available bandwidth or the second recommended information based on the historical statistical information of the bandwidth between the first access network device and the first user plane network element, refer to the process of determining the available bandwidth between the first access network device and the first terminal device based on the historical statistical information of the bandwidth between the first access network device and the first terminal device in the foregoing first or third alternative implementation, or the process of determining the recommended information in the foregoing first or third alternative implementation. For example, refer to the first alternative implementation. Feature information of a bandwidth between the first access network device and the first user plane network element is determined based on the historical statistical information of the bandwidth between the first access network device and the first user plane network element, to determine the second available bandwidth or the second recommended information. For another example, refer to the third alternative implementation. The second available bandwidth or the second recommended information is determined based on an instantaneous used bandwidth at each moment in the historical statistical information of the bandwidth between the first access network device and the first user plane network element. Another example is not described. Details are not described herein again.

In the foregoing descriptions of determining the second information based on the historical statistical information of the bandwidth between the first access network device and the first terminal device, compared with a bandwidth change that is of the first terminal device and that is obtained through averaging within a time window, the historical statistical information of the bandwidth between the first access network device and the first terminal device in at least one embodiment, for example, the feature information of the bandwidth obtained through statistical collection and related information of another second terminal device served by the first access network device, more accurately reflects a change rule of the bandwidth between the first access network device and the first terminal device, so that the link over which the first terminal device receives the media data of the first media is more accurately and comprehensively predicted, to obtain more practical and effective second information.

S304: The first network element sends the second information to the second network element.

In an implementation, the second network element includes the first terminal device and/or the media server. In other words, the second network element and the first terminal device is a same device or different devices.

In a sending process, in an implementation, the first network element uses the second network element as a destination network element, and send the second information to the second network element. For example, the first network element uses the AF network element as a destination network element, and send the second information to the AF network element. Alternatively, the first network element uses another network element as a destination network element, and forward the second information to the second network element through the another network element. For example, the first network element uses the SMF network element as a destination network element, and send the second information to the SMF network element. After receiving the second information, the SMF network element forwards the second information to the second network element.

S305: The second network element selects or adjusts, based on the second information, the media data of the first media received by the first terminal device.

Step S305 is an optional step.

After receiving the second information, the second network element determines a first code rate based on the second information, where the first code rate is a code rate of the media data of the first media received by the first terminal device within the first period, so that the second network element selects or adjusts, based on the first code rate, the code rate of the media data of the first media transmitted to the first terminal device.

In a process in which the second network element determines the first code rate, in an optional manner, in response to the second information including the recommended code rate, the second network element determines the recommended code rate as the first code rate. In another optional manner, the second network element determines the first code rate based on the second information. In still another optional manner, the second network element determines the first code rate based on the second information and one or both of the state information and/or throughput information of the first terminal device. The state information indicates the state of the media data of the first media buffered by the first terminal device. The throughput information of the first terminal device is an average throughput of the first terminal device within a specific period, or includes an instantaneous throughput of the first terminal device.

In response to the second network element being the media server, the first terminal device sends the state information and/or the throughput information of the first terminal device to the media server, so that the media server determines the first code rate based on the state information and/or the throughput information of the first terminal device. For example, in response to sending the code rate adjustment request that carries the first information to the media server, the first terminal device sends the state information and/or the throughput information of the first terminal device to the media server. For another example, the first terminal device periodically reports the state information and/or the throughput information of the first terminal device to the media server.

Different models for determining the first code rate is established in the first terminal device and/or the media server. Based on the different models, the second information and one or both of the state information or the throughput information of the first terminal device are used as input parameters of the model, and the first code rate is output according to different algorithms in the model. The model for determining the first code rate is not specifically limited herein, and is merely described by using an example. For example, in response to the second information including the recommended code rate, in response to the state information of the first terminal device indicating that the media data of the first media buffered by the first terminal device exceeds a first buffer threshold, the first code rate is determined as a code rate higher than the recommended code rate. For another example, in response to the second information including the recommended code rate, a determination is made whether a throughput of the first terminal device within the first period is less than a bandwidth corresponding to the recommended code rate. In response to the throughput being less than a preset percentage of the bandwidth, the first code rate is determined as a code rate lower than the recommended code rate. For still another example, in response to the second information including the information about the first bandwidth, a throughput of the first terminal device within the first period is estimated based on the throughput information of the first terminal device. In response to the estimated throughput being less than the information about the first bandwidth, the first code rate is determined based on the estimated throughput; otherwise, the first code rate is determined based on the information about the first bandwidth.

After the first code rate is determined, the first terminal device or the media server selects or adjusts the code rate of the media data of the transmitted first media. A manner in which the first terminal device or the media server selects or adjusts the code rate of the media data of the transmitted first media varies based on different manners in which the media server stores or processes the media data of the first media. The following provides descriptions in different cases.

In a first case, in response to the first terminal device selecting or adjusting the code rate of the media data of the first media, after determining the first code rate, the first terminal device sends the first code rate to the media server.

In a second case, in response to the media server selecting or adjusting the code rate of the media data of the first media, the media server determines the first code rate.

In the first case and the second case, after the media server receives the first code rate or determines the first code rate, in response to there being a media file with the first code rate of the first media in the media server, the media server sends the media file with the first code rate of the first media to the first terminal device. In response to there is no media file with the first code rate of the first media in the media server, the media server performs, based on the first code rate, encoding processing on the media data of the first media that exists in the media server, to obtain the media file with the first code rate of the first media, and send the obtained media file with the first code rate of the first media to the first terminal device.

In a third case, in response to the first terminal device selecting or adjusting the code rate of the media data of the first media, the first terminal device obtains storage locations of media data with different code rates of the first media from the media server in advance, determine a storage location of media data with the first code rate of the first media, and obtain the media data with the first code rate of the first media based on the storage location. For example, the media server includes a media storage server and a media management server. In moving picture experts group (Moving Picture Experts Group, MPEG)-dynamic adaptive streaming over HTTP (Dynamic Adaptive Streaming over HTTP, DASH), media data with different code rates of the first media is pre-stored in different media storage servers, and the media management server sends storage locations of media data with various code rates of the first media to the first terminal device in advance via a media presentation description (Media Presentation Description, MPD) file. Further, the first terminal device obtains the media data with the first code rate of the first media from a corresponding media storage server based on the first code rate.

In a fourth case, in response to the media server selecting or adjusting the code rate of the media data of the first media, after the first code rate is determined, the media server sends a storage location of media data with the first code rate of the first media to the first terminal device, and the first terminal device obtains the media data with the first code rate of the first media based on the storage location.

The implementations in the foregoing four cases are merely example implementations in which the first terminal device or the media server selects or adjusts the code rate of the media data of the transmitted first media in at least one embodiment, and are not all implementations limited in at least one embodiment.

In at least one embodiment, the first terminal device sends the first information of the first terminal device to the first network element, where the first information of the first terminal device includes the first indication information. The first network element determines, based on the first indication information, the first access network device connected to the first terminal device, and determines the second information based on the historical statistical information of the bandwidth between the first access network device and the first terminal device. Further, the first network element sends the second information to the second network element, and the second network element determines the first code rate based on the second information, where the first code rate indicates the code rate of the media data of the first media received by the first terminal device. The first network element predicts the network condition of the media transmission link of the terminal based on the historical statistical information of the bandwidth of the media transmission link, and then adjusts the code rate of the transmitted media data based on the second information obtained through prediction, to improve accuracy and real-time performance of code rate adjustment of the media data, and further improve effectiveness of the code rate adjustment.

Figure 5:
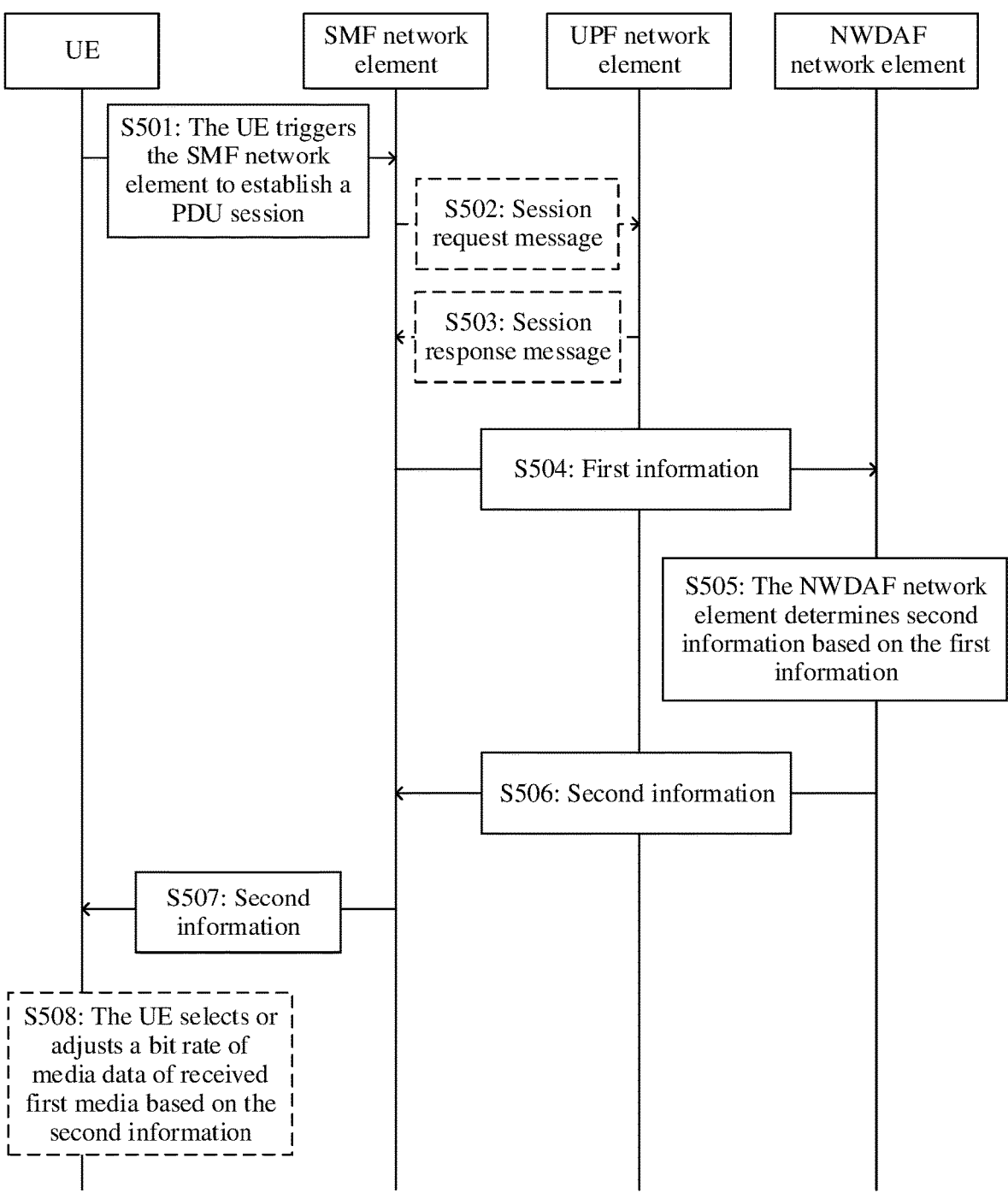
FIG. 5 is a schematic flowchart of another information determining method according to at least one embodiment.

FIG. 5 is a schematic flowchart of another information determining method according to at least one embodiment. The information determining method provided in FIG. 5 is applied to scenarios of PDU session establishment triggered by UE. The scenarios include a scenario in which a new PDU session is established, a scenario in which in response to an N26 interface (where the N26 interface is an interface between an AMF network element and an MME network element (mobility management network element in a 4G system)) not being deployed, a public data network (Public Data Network, PDN) connection in an evolved packet system (Evolved Packet System, EPS) is switched to a PDU session in a system architecture for a 5G system (System architecture for a 5G System, 5GS), a scenario in which an existing PDU session is switched between non-3GPP access and 3GPP access, and the like. In a process of establishing a PDU session, the UE selects or adjusts a code rate of media data of first media received by the UE, to improve accuracy and real-time performance of code rate adjustment of the media data, and further improve effectiveness of the code rate adjustment. As shown in FIG. 5, the information determining method includes steps S501 to S508.

S501: The UE triggers an SMF network element to establish the PDU session.

In response to triggering the SMF network element to establish the PDU session, the UE sends first information of the UE to the SMF network element. For example, the first information is included in a trigger message used by the UE to trigger the SMF network element to establish the PDU session. The first information includes first indication information indicating a (R)AN device connected to the UE. Optionally, the first information further includes one or more of the following information: first period indication information, a media identifier, an optional code rate, or state information of the first media, or second indication information. For related descriptions of various information specifically included in the first information, refer to related descriptions of corresponding information included in the first information in the embodiment corresponding to FIG. 3. Details are not described herein again.

The UE triggers, through the (R)AN device, the AMF network element, and the like, the SMF network element to establish the PDU session. Specifically, the UE triggers the SMF network element to establish the PDU session, and send the first information of the UE to the SMF network element through the following steps.

(1) The UE sends a PDU session establishment request to the AMF network element through the (R)AN device, where the PDU session establishment request carries the first information of the UE.

(2) The AMF network element selects the SMF network element for the UE.

Specifically, the PDU session establishment request sent by the UE includes a type of the PDU session that the UE requests to establish. The AMF network element selects the SMF network element for the UE based on the type of the PDU session that the UE requests to establish.

(3) The AMF network element sends an N4 context create request to the SMF network element that is selected for the UE, where the N4 context create request carries the first information of the UE.

S502: The SMF network element sends a session request message to a UPF network element.

For example, the session request message is an N4 session establishment request message.

Specifically, the SMF network element selects the UPF network element for the UE based on information such as load, a location, and a capacity of each UPF network element, and then sends the N4 session establishment request message to the selected UPF network element. In response to an N4 session being established, the SMF network element configures, for the SMF network element, a quality of service (Quality of Service, QoS) rule, a forwarding policy, and the like for media data transmission.

S503: The UPF network element sends a session response message to the SMF network element.

For example, the session response message is an N4 session establishment response message.

Steps S502 and S503 are optional steps.

S504: The SMF network element sends the first information to an NWDAF network element.

For example, the SMF network element sends a first prediction request to the NWDAF network element, where the first prediction request carries the first information, and the first prediction request is useable for requesting the NWDAF network element to determine second information based on the first information, so that the NWDAF network element predicts a link over which the UE receives the media data of the first media.

In an optional implementation, the trigger message, the PDU session establishment request, the N4 context create request, the N4 session establishment request message, the N4 session establishment response message, and the first prediction request are jointly for implementing functions of carrying the first information transmitted from the UE to the SMF network element and triggering the SMF network element to send the first information to the NWDAF network element.

S505: The NWDAF network element determines the second information based on the first information.

Specifically, the NWDAF network element determines, based on the first indication information in the first information, the (R)AN device connected to the UE. Further, the NWDAF network element determines the second information based on historical statistical information of a bandwidth between the (R)AN device and the UE.

Herein, for a specific implementation in which the NWDAF network element determines the second information based on the first information, refer to the implementation in which the first network element determines the second information based on the first information in the embodiment corresponding to FIG. 3. Details are not described herein again.

S506: The NWDAF network element sends the second information to the SMF network element.

S507: The SMF network element sends the second information to the UE.

For example, the SMF network element sends a PDU session establishment response message to the UE, where the PDU session establishment response message carries the second information.

S508: The UE selects or adjusts the code rate of the media data of the received first media based on the second information.

Step S508 is an optional step.

For an implementation in which the UE selects or adjusts the code rate of the media data of the received first media based on the second information, refer to the specific implementation in which the first terminal device selects or adjusts the code rate of the media data of the transmitted first media described in step S304 in the embodiment corresponding to FIG. 3, for example, the implementation in the first case or the third case provided in step S304.

In at least one embodiment, in the process in which the UE establishes the PDU session, the NWDAF network element determines the second information based on the historical statistical information of the bandwidth between the UE and the (R)AN device, the SMF network element sends the second information to the UE via the PDU session establishment response message, and the UE adjusts the code rate of the transmitted media data based on the second information, to improve the accuracy and the real-time performance of the code rate adjustment of the media data, and further improve the effectiveness of the code rate adjustment.

Figure 6:
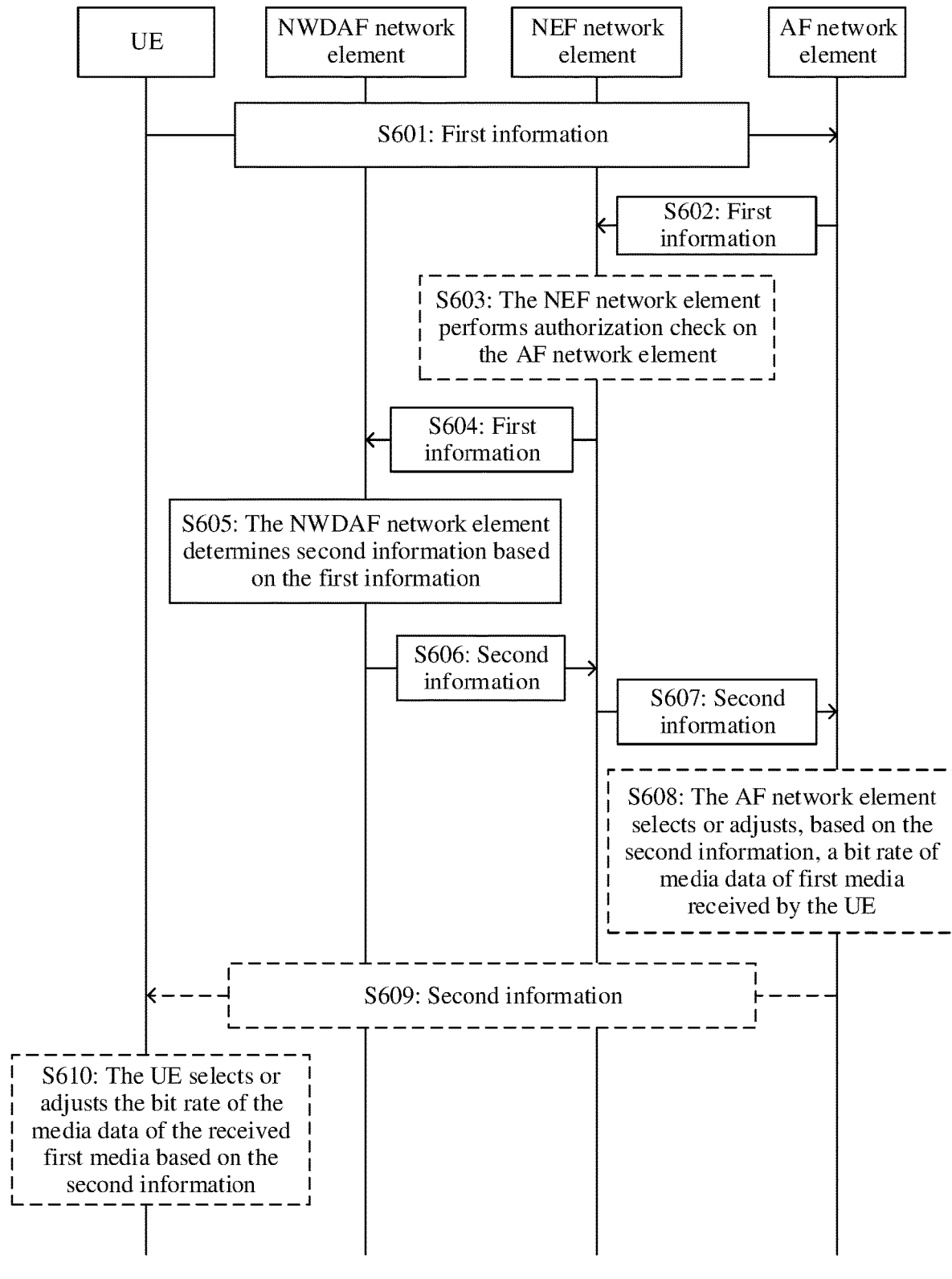
FIG. 6 is a schematic flowchart of still another information determining method according to at least one embodiment.

FIG. 6 is a schematic flowchart of still another information determining method according to at least one embodiment. The information determining method provided in FIG. 6 is applied to a scenario in which UE interacts with an AF network element via an application layer message and triggers an NWDAF network element to predict a link over which the UE receives media data. In this scenario, the AF network element is a media server that manages the media data of first media and selects a code rate of the media data. The UE triggers, via the application layer message, selection or adjustment of the code rate of the media data of the first media received by the UE, to improve accuracy and real-time performance of code rate adjustment of the media data, and further improve effectiveness of the code rate adjustment. As shown in FIG. 6, the information determining method includes the following steps.

S601: The UE sends first information to the AF network element.

For example, the UE sends a code rate adjustment request to the AF network element via the application layer message, where the code rate adjustment request carries the first information of the UE.

The application layer message is a message exchanged between processes. The UE sends, via the application layer message, the code rate adjustment request to a process that is in the AF network element and that is responsible for the code rate adjustment. For example, the application layer message is a hypertext transfer protocol (Hypertext Transfer Protocol, HTTP) command, a real-time transport control protocol (Real-time Transport Control Protocol, RTCP) command, or the like.

The first information in the code rate adjustment request includes first indication information, and the first indication information is useable for determining a ®AN device connected to the UE. Optionally, prediction reference information further includes one or more of the following information: first period indication information, a media identifier, an optional code rate, or state information of the first media, or second indication information. For related descriptions of various information specifically included in the first information, refer to related descriptions of corresponding information included in the first information in the embodiment corresponding to FIG. 3. Details are not described herein again.

S602: The AF network element sends the first information to an NEF network element.

For example, the AF network element sends a second prediction request to the NEF network element, where the second prediction request carries the first information of the UE, and the second prediction request is useable for requesting the NEF network element to forward the first information to the NWDAF network element, so that the NWDAF network element determines second information based on the first information, and the NWDAF network element predicts the link over which the UE receives the media data of the first media.

S603: The NEF network element performs authorization check on the AF network element.

Step S603 is an optional step.

The NEF network element specifically checks whether the AF network element has permission to access a core network, and performs S604 after the authorization check succeeds.

S604: The NEF network element sends the first information to the NWDAF network element.

For example, the NEF network element sends the second prediction request to the NWDAF network element, where the second prediction request carries the first information.

In an optional implementation, in at least one embodiment, the code rate adjustment request and the second prediction request are jointly for implementing functions of carrying the first information transmitted from the UE to the AF network element and triggering the AF network element to send the first information to the NWDAF network element.

S605: The NWDAF network element determines the second information based on the first information.

Specifically, the NWDAF network element determines, based on the first indication information in the first information, the ®AN device connected to the UE. Further, the NWDAF network element determines the second information based on historical statistical information of a bandwidth between t®(R)AN device and the UE.

Herein, for a specific implementation in which the NWDAF network element determines the second information based on the first information, refer to the implementation in which the first network element determines the second information based on the first information in the embodiment corresponding to FIG. 3. Details are not described herein again.

S606: The NWDAF network element sends the second information to the NEF network element.

S607: The NEF network element sends the second information to the AF network element.

S608: The AF network element selects or adjusts, based on the second information, the code rate of the media data of the first media received by the UE.

Step S608 is an optional step.

S609: The AF network element sends the second information to the UE.

S610: The UE selects or adjusts the code rate of the media data of the received first media based on the second information.

After the second information is determined in at least one embodiment, selection or adjustment performed on the code rate of the media data of the first media received by the UE is performed by the AF network element or the UE. In response to the selection or adjustment being performed by the AF network element, only step S608 is performed after step S607. In response to the selection or adjustment being performed by the UE, step S609 is performed after step S607, and optionally, optional step S610 is performed after step S609.

Herein, for an implementation in which the UE selects or adjusts the code rate of the media data of the received first media based on the second information, refer to the specific implementation in which the first terminal device selects or adjusts the code rate of the media data of the transmitted first media described in step S305 in the embodiment corresponding to FIG. 3, for example, the implementation in the first case or the third case provided in step S305. For an implementation in which the AF network element selects or adjusts, based on the second information, the code rate of the media data of the first media received by the UE, refer to the specific implementation in which the media server selects or adjusts the code rate of the media data of the first media transmitted by the UE described in step S305 in the embodiment corresponding to FIG. 3, for example, the implementation in the second case or the fourth case provided in step S305.

In an optional implementation scenario, the code rate adjustment request sent by the UE to the AF network element is a request for obtaining the media data of the first media, and carries the media identifier of the first media and the first indication information. The AF network element processes at least two optional code rates of the first media and the first indication information as new prediction reference information based on the media identifier of the first media, and sends the new prediction reference information to the NWDAF network element. The unprocessed and processed prediction reference information carries one or more of the following information: the first period indication information, the media identifier, the optional code rate, or the state information of the first media, or the second indication information. The NWDAF network element predicts the link over which the UE receives the media data of the first media. After determining information about a first bandwidth, the NWDAF network element determines a recommended code rate from the at least two optional code rates of the first media based on the information about the first bandwidth, and sends the recommended code rate as the second information to the AF network element. Further, the AF network element selects or adjusts, based on the recommended code rate, the code rate of the media data of the first media received by the UE, and sends corresponding adjusted media data to the UE.

In at least one embodiment, the UE interacts with the AF network element via the application layer message. The AF network element triggers the NWDAF network element to determine the second information based on the historical statistical information of the bandwidth between the UE an ®he (R)AN device, and sends the second information to the AF network element. The AF network element or the UE selects or adjusts the code rate of the media data of the first media received by the UE. This improves the accuracy and the real-time performance of the code rate adjustment of the media data, and further improve the effectiveness of the code rate adjustment.

Figure 7:
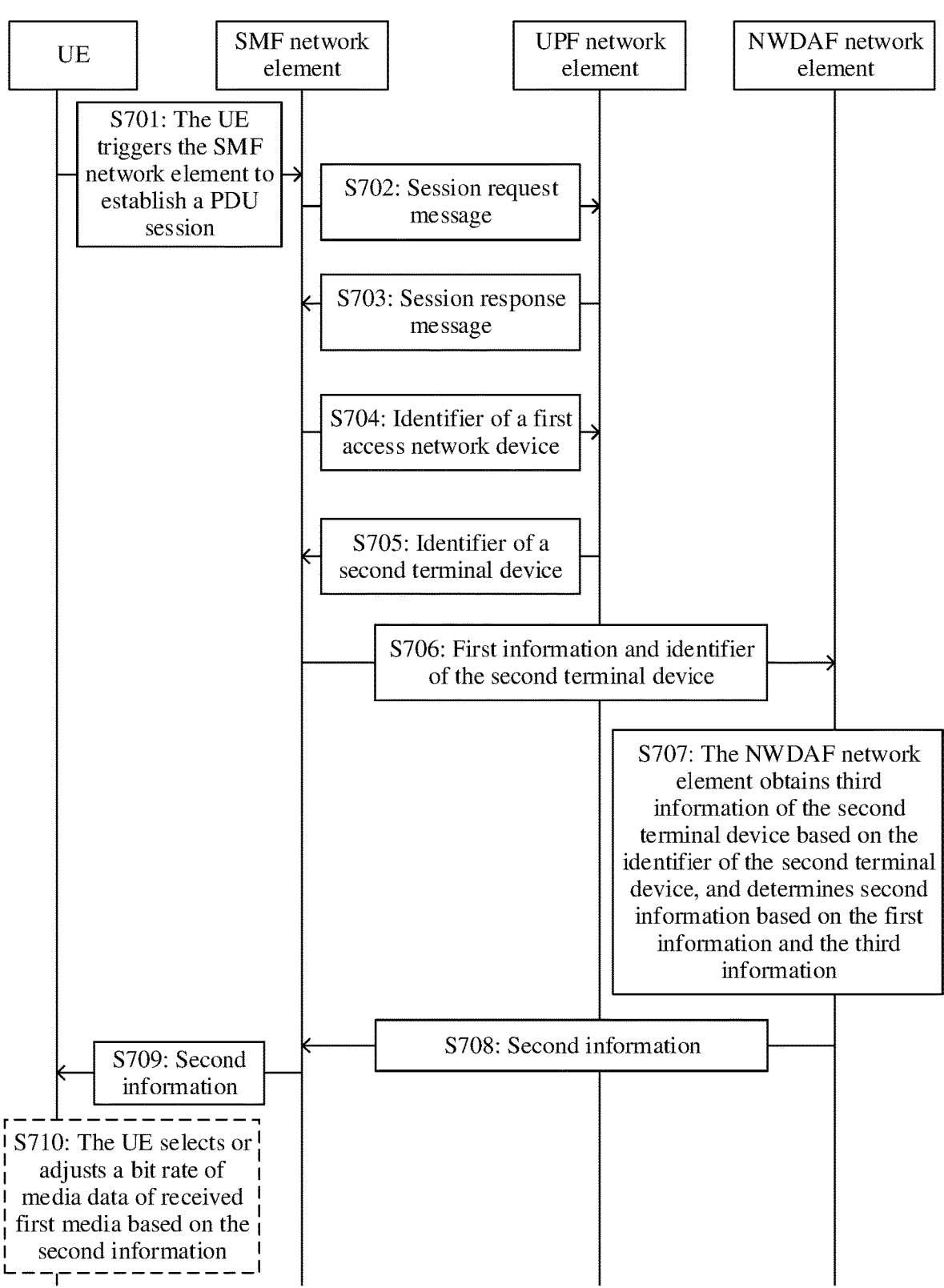
FIG. 7 is a schematic flowchart of yet another information determining method according to at least one embodiment.

FIG. 7 is a schematic flowchart of still another information determining method according to at least one embodiment. The information determining method shown in FIG. 7 is applied to a scenario of PDU session modification triggered by UE. In this scenario, a code rate of media data of first media received by the UE is adjusted in response to media transmission quality of each terminal device ser® by a (R)AN device connected to the UE being considered. As shown in FIG. 7, the method includes the following steps:

S701: The UE triggers an SMF network element to establish a PDU session.

In response to triggering the SMF network element to establish the PDU session, the UE sends first information of the UE to the SMF network element. For example, the first information is included in a trigger message used by the UE to trigger the SMF network element to establish the PDU session. The first information includes first indication information for dete®ning the (R)AN device connected to the UE.

S702: The SMF network element sends a session request message to a UPF network element.

For example, the session request message is an N4 session establishment request message.

S703: The UPF network element sends a session response message to the SMF network element.

For example, the session response message is an N4 session establishment response message.

For implementation manners of steps S701 to S703, refer to implementation manners of S501 to S503 in the embodiment corresponding to FIG. 5. Details are not described herein again.

S704: The SMF network element sends an identifier of the first access network device to the UPF network element.

For example, the SMF network element sends an N4 session modification request message to the UPF network element. The N4 session modification request message includes an identifier reporting request, and the identifier reporting request includes the identifier of the first access network device. Optionally, the identifier reporting request further includes media service detection information.

S705: The UPF network element sends an identifier of a second terminal device to the SMF network element.

For example, the UPF network element sends an N4 session modification response message to the SMF network element, where the N4 session modification response message includes the identifier of the second terminal device.

The second terminal device is a terminal device that transmits media data and that is ®rued by the (R)AN device connected to the UE.

S706: The SMF network element sends the first information and the identifier of the second terminal device to an NWDAF network element.

For example, the SMF network element sends a first prediction request to the NWDAF network element, where the first prediction request carries the first information, and the first prediction request is useable for requesting the NWDAF network element to determine second information, so that the NWDAF network element predicts a link over which the UE receives the media data of the first media.

S707: The NWDAF network element obtains third information of the second terminal device based on the identifier of the second terminal device, and determines the second information based on the first information and the third information.

The third information of the second terminal device includes one or more of the following information: an optional code rate of second media, information about a state of the media data of the second media buffered by the second terminal device, third indication information, and second period indication information. The third indication information indicates a second user plane network element corresponding to the second terminal device, and the second period indication information indicates a period within which the second terminal device receives the media data of the second media. The third information of the second terminal device is reported by the second terminal device to the NWDAF network element in response to the second terminal device requesting adaptive code rate adjustment.

Specifically, the NWDAF network element determines, based on the first indication information in the first information, the (R)AN device connected to the UE, and determine the second information based on historical statistical information of a bandwidth between the UE and the (R)AN device and the third information of the second terminal device.

S708: The NWDAF network element sends the second information to the SMF network element.

S709: The SMF network element sends the second information to the UE.

For example, the SMF network element sends a PDU session establishment response message to the UE, where the PDU session establishment response message carries the second information.

S710: The UE selects or adjusts the code rate of the media data of the received first media based on the second information.

Step S710 is an optional step. For descriptions of the identifier reporting request in S704, a manner in which the UPF network element determines the second terminal device in S705, and a manner in which the NWDAF network element determines the second information in S707, refer to corresponding descriptions of the fourth alternative implementation in the descriptions of step S303 in the embodiment corresponding to FIG. 3. A manner in which the UE selects or adjusts the code rate of the media data of the received first media based on the second information in S710, refer to the implementation in which the first terminal device selects or adjusts the code rate in the embodiment corresponding to FIG. 3. Details are not described herein again.

In at least one embodiment, after the PDU session of the UE is established, in the scenario of the PDU session modification, the SMF network element obtains, from the UPF network element, the identifier of another second terminal device that is served by the (R)AN device connected to the UE and that transmits the media data, and sends the identifier to the NWDAF network element. Further, the NWDAF network element obtains the third information of the second terminal device from an OAM system based on the identifier of the second terminal device, determines the second information based on the first information and the third information, and then sends the second information to the UE through the SMF network element. The UE adjusts the code rate of the transmitted media data based on the second information. This improves accuracy and real-time performance of code rate adjustment of the media data received by the UE, and further improves effectiveness of the code rate adjustment.

Figure 8:
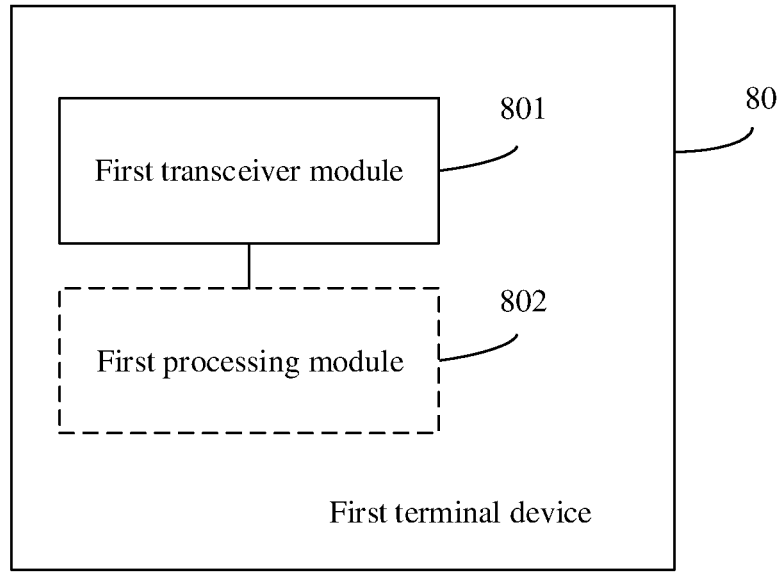
FIG. 8 is a schematic diagram of a structure of a first terminal device according to at least one embodiment.

The foregoing describes the information determining methods provided in at least one embodiment. The following describes related devices in the methods. First, FIG. 8 is a schematic diagram of a structure of a first terminal device according to at least one embodiment. As shown in FIG. 8, the first terminal device 80 includes at least a first transceiver module 801.

The first transceiver module 801 is configured to:

send first information to a first network element, where the first information includes first indication information, and the first indication information is useable for determining a first access network device connected to the first terminal device 80; and receive second information from the first network element, where the second information is determined based on historical statistical information of a bandwidth between the first access network device and the first terminal device 80, the second information is useable for determining a first code rate, and the first code rate indicates a code rate of media data of first media received by the first terminal device 80.

In an optional manner, the first indication information includes location information of the first terminal device 80 and/or an identifier of the first access network device.

In another optional manner, the first information further includes first period indication information, and the first period indication information indicates a period within which the first terminal device 80 receives the media data of the first media.

In another optional manner, the first information further includes one or more of the following information: a media identifier, an optional code rate, or state information of the first media, where the state information indicates a state of the media data of the first media buffered by the first terminal device 80.

In another optional manner, the first information further includes second indication information, and the second indication information indicates a first user plane network element corresponding to the first terminal device 80. The second information is determined based on the historical statistical information of the bandwidth between the first access network device and the first terminal device 80 and historical statistical information of a bandwidth between the first access network device and the first user plane network element.

In another optional manner, the second information includes a recommended code rate or information about a first bandwidth.

In another optional manner, the recommended code rate is one of at least two optional code rates corresponding to the first media.

In another optional manner, the first code rate is determined based on the second information and one or both of the state information or throughput information of the first terminal device 80, where the state information indicates the state of the media data of the first media buffered by the first terminal device 80.

In still another optional manner, the first terminal device 80 further includes a first processing module 802, configured to determine the first code rate based on the second information.

The first terminal device 80 in at least one embodiment implements the steps, for example, step S301 or S305, performed by the first terminal device in the embodiment corresponding to FIG. 3, or perform the steps performed by the UE in FIG. 5, FIG. 6, or FIG. 7. For specific implementations of functional components included in the first terminal device and corresponding beneficial effects in FIG. 8, refer to the specific descriptions of the embodiments in FIG. 3 and FIG. 5 to FIG. 7.

Figure 9:
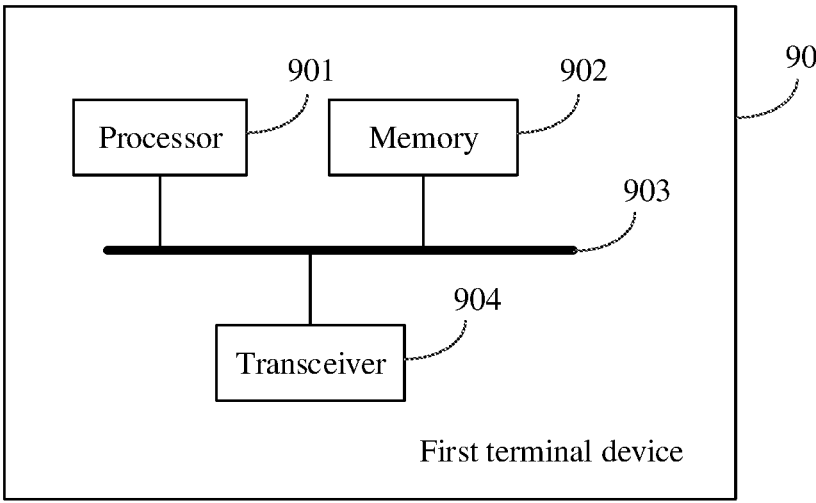
FIG. 9 is a schematic diagram of a structure of another first terminal device according to at least one embodiment.

The first terminal device in the embodiment shown in FIG. 8 is implemented as a first terminal device 90 shown in FIG. 9. FIG. 9 is a schematic diagram of a structure of another first terminal device according to at least one embodiment. As shown in FIG. 9, the first terminal device 90 includes a processor 901, a memory 902, and a transceiver 904.

The processor 901 is configured to: process or determine first information that is of the first terminal device and that is sent to a first network element, determine a first code rate, or the like, for example, implement step S305 in the embodiment corresponding to FIG. 3.

The memory 902 is configured to store program code and data that are executed by the first terminal device 90. The processor 901 executes the application program code stored in the memory 902, to implement actions of the first terminal device provided in the embodiment shown in FIG. 3 or the UE provided in any one of the embodiments shown in FIG. 5 to FIG. 7.

The processor 901 is communicatively connected to the memory 902, for example, through a bus 903. The bus 903 is a PCI bus, an EISA bus, or the like. The bus 903 is classified into an address bus, a data bus, a control bus, and the like. For ease of representation, only one thick line is used to represent the bus in FIG. 9, but this does not mean that there is only one bus or only one type of bus.

The transceiver 904 is configured to support information transmission between the first terminal device 90 and the first network element, the SMF network element, the AF network element, or the like in the foregoing embodiments, for example, implement step S301 in the embodiment corresponding to FIG. 3, step S501 in the embodiment corresponding to FIG. 5, step S508 in the embodiment corresponding to FIG. 5, or step S601 in the embodiment corresponding to FIG. 6.

In actual use, the first terminal device 90 includes one or more processors, and the structure of the first terminal device 90 does not constitute a limitation in at least one embodiment.

The processor 901 is a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logical device, a transistor logical device, a hardware component, or any combination thereof. The processor implements or executes various example logical blocks, modules, and circuits described with reference to content disclosed in at least one embodiment. The processor is a combination of processors implementing a computing function, for example, a combination of one or more microprocessors, or a combination of the DSP and a microprocessor.

The transceiver 904 is a communication interface, a transceiver circuit, or the like. The transceiver is a general term. During specific implementation, the transceiver includes a plurality of interfaces.

The memory 902 includes a volatile memory (volatile memory), for example, a random access memory (random access memory, RAM). The memory 902 also includes a non-volatile memory (non-volatile memory), for example, a read-only memory (read-only memory, ROM), a flash memory (flash memory), a hard disk drive (hard disk drive, HDD), or a solid-state drive (solid-state drive, SSD). The memory 902 further includes a combination of the foregoing types of memories.

At least one embodiment further provides a computer storage medium. The computer storage medium is configured to store computer software instructions used by the first terminal device 90 in the embodiment shown in FIG. 9. The computer software instructions include a program designed for the first terminal device 90 in the foregoing embodiments. The storage medium includes but is not limited to a flash memory, a hard disk drive, or a solid-state drive.

At least one embodiment further provides a computer program product. In response to the computer product being run by a first terminal device, the information determining method designed for the first terminal device 90 in the embodiment shown in FIG. 9 is performed.

Figure 10:
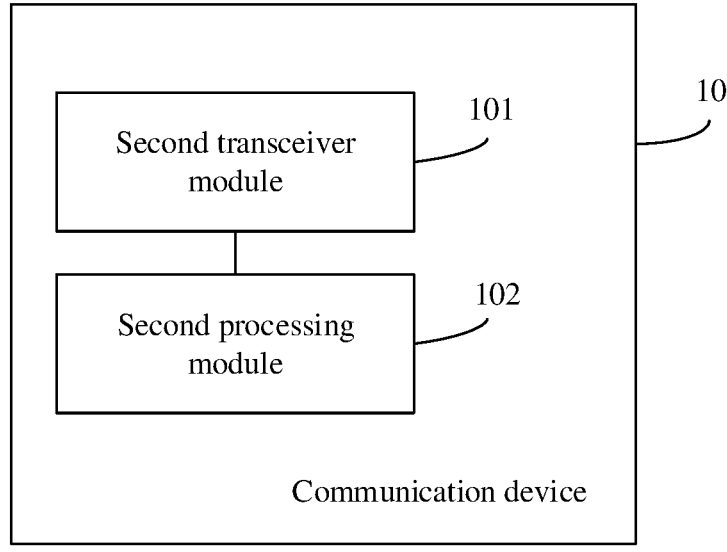
FIG. 10 is a schematic diagram of a structure of a communication device according to at least one embodiment.

FIG. 10 is a schematic diagram of a structure of a communication device according to at least one embodiment. As shown in FIG. 10, the communication device 10 includes at least a second transceiver module 101 and a second processing module 102. Details are as follows:

The second transceiver module 101 is configured to receive first information from a first terminal device, where the first information includes first indication information.

The second processing module 102 is configured to determine, based on the first indication information, a first access network device connected to the first terminal device.

The second processing module 102 is further configured to determine second information based on historical statistical information of a bandwidth between the first access network device and the first terminal device, where the second information is useable for determining a first code rate, and the first code rate indicates a code rate of media data of first media received by the first terminal device.

The second transceiver module 101 is further configured to send the second information to a second network element.

In an optional manner, the first indication information includes location information of the first terminal device and/or an identifier of the first access network device.

In another optional manner, the second network element includes the first terminal device and/or a media server.

In another optional manner, the second transceiver module 101 is further configured to:

obtain an identifier of the first terminal device;

send the identifier of the first access network device and the identifier of the first terminal device to a network management network element; and receive the historical statistical information of the bandwidth between the first access network device and the first terminal device from the network management network element.

In another optional manner, the first information further includes first period indication information, and the first period indication information indicates a period within which the first terminal device receives the media data of the first media.

In another optional manner, the first information further includes one or more of the following information: a media identifier, an optional code rate, or state information of the first media, where the state information indicates a state of the media data of the first media buffered by the first terminal device.

In another optional manner, the first information further includes second indication information, and the second indication information indicates a first user plane network element corresponding to the first terminal device.

The second processing module 102 is specifically configured to:

determine the second information based on the historical statistical information of the bandwidth between the first access network device and the first terminal device and historical statistical information of a bandwidth between the first access network device and the first user plane network element.

In another optional manner, the second information includes a recommended code rate or information about a first bandwidth.

In another optional manner, the second processing module 102 is specifically configured to:

determine the information about the first bandwidth between the first terminal device and the first access network device based on the historical statistical information of the bandwidth between the first access network device and the first terminal device; and determine the recommended code rate based on the information about the first bandwidth.

In another optional manner, the second processing module 102 is specifically configured to:

determine, based on the information about the first bandwidth, the recommended code rate from at least two optional code rates corresponding to the first media.

In another optional manner, the first code rate is determined based on the second information and one or both of the state information or throughput information of the first terminal device, where the state information indicates the state of the media data of the first media buffered by the first terminal device.

In another optional manner, the second transceiver module 101 is further configured to:

receive an identifier of a second terminal device, where there are one or more second terminal devices, and the second terminal device is a terminal device that receives media data of second media through the first access network device.

The second processing module 102 is specifically configured to:

determine the second information based on the identifier of the second terminal device and the historical statistical information of the bandwidth between the first access network device and the first terminal device.

In still another optional manner, the second processing module 102 is specifically configured to:

obtain third information based on the identifier of the second terminal device, where the third information includes one or more of the following information: an optional code rate of the second media, information about a state of the media data of the second media buffered by the second terminal device, third indication information, and second period indication information, the third indication information indicates a second user plane network element corresponding to the second terminal device, and the second period indication information indicates a period within which the second terminal device receives the media data of the second media; and determine the second information based on the third information and historical statistical information of the bandwidth between the first access network device and the first terminal device.

The communication device 10 in at least one embodiment implements the steps, for example, steps S302 to S304, performed by the first network element in the embodiment corresponding to FIG. 3, or perform the steps performed by the NWDAF network element in FIG. 5 to FIG. 7. For specific implementations of functional components included in the communication device 10 and corresponding beneficial effects in FIG. 10, refer to the specific descriptions of the embodiments in FIG. 3 and FIG. 5 to FIG. 7.

Figure 11:
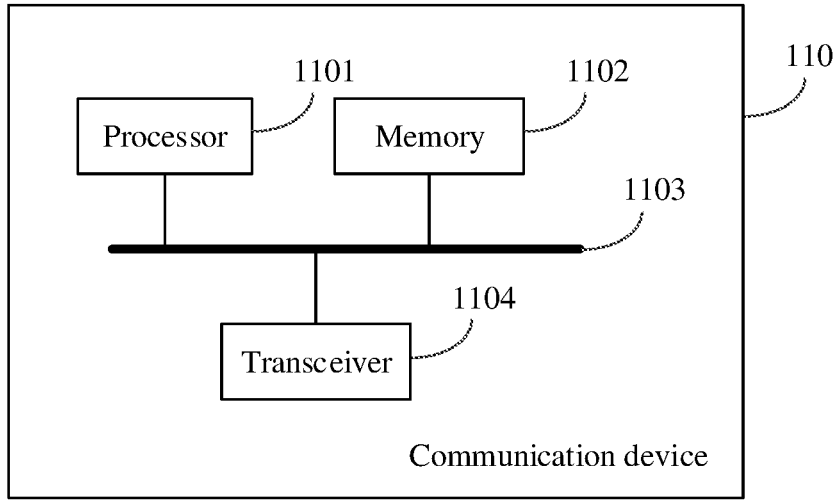
FIG. 11 is a schematic diagram of a structure of another communication device according to at least one embodiment.

The communication device in the embodiment shown in FIG. 10 is implemented as a communication device 11 shown in FIG. 11. FIG. 11 is a schematic diagram of a structure of another communication device according to at least one embodiment. As shown in FIG. 11, the communication device 110 includes a processor 1101, a memory 1102, and a transceiver 1104.

The processor 1101 is configured to determine a first access network device, determine second information, or the like, for example, implement step S302 or S303 in the embodiment corresponding to FIG. 3, step S505 in the embodiment corresponding to FIG. 5, or step S605 in the embodiment corresponding to FIG. 6.

The memory 1102 is configured to store program code and data that are executed by the communication device 110. The processor 1101 executes the application program code stored in the memory 1102, to implement the steps of the first network element provided in the embodiment shown in FIG. 3 or the NWDAF network element provided in any one of the embodiments shown in FIG. 5 to FIG. 7.

The processor 1101 is communicatively connected to the memory 1102, for example, through a bus 1103. The bus 1103 is a PCI bus, an EISA bus, or the like. The bus 1103 is classified into an address bus, a data bus, a control bus, and the like. For ease of representation, only one thick line is used to represent the bus in FIG. 11, but this does not mean that there is only one bus or only one type of bus.

The transceiver 1104 is configured to support information transmission between the communication device 110 and the first terminal device, the SMF network element, the AF network element, the NEF network element, or the like in the foregoing embodiments, for example, implement step S304 in the embodiment corresponding to FIG. 3, step S506 in the embodiment corresponding to FIG. 5, step S504 in the embodiment corresponding to FIG. 5, or step S606 in the embodiment corresponding to FIG. 6.

In actual use, the communication device 110 includes one or more processors, and the structure of the communication device 110 does not constitute a limitation in at least one embodiment.

The processor 1101 is a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logical device, a transistor logical device, a hardware component, or any combination thereof. The processor implements or executes various example logical blocks, modules, and circuits described with reference to content disclosed in at least one embodiment. The processor is a combination of processors implementing a computing function, for example, a combination of one or more microprocessors, or a combination of the DSP and a microprocessor.

The transceiver 1104 is a communication interface, a transceiver circuit, or the like. The transceiver is a general term. During specific implementation, the transceiver includes a plurality of interfaces.

The memory 1102 includes a volatile memory (volatile memory), for example, a random access memory (random access memory, RAM). The memory 1102 also includes a non-volatile memory (non-volatile memory), for example, a read-only memory (read-only memory, ROM), a flash memory (flash memory), a hard disk drive (hard disk drive, HDD), or a solid-state drive (solid-state drive, SSD). The memory 1102 further includes a combination of the foregoing types of memories.

At least one embodiment further provides a computer storage medium. The computer storage medium is configured to store computer software instructions used by the communication device in the embodiment shown in FIG. 11, and the computer software instructions include a program designed for the communication device in the foregoing embodiments. The storage medium includes but is not limited to a flash memory, a hard disk drive, or a solid-state drive.

At least one embodiment further provides a computer program product. In response to the computer product is run by the communication device, the information determining method designed for the communication device in the embodiment shown in FIG. 11 is performed.

At least one embodiment further provides an information determining system. The information determining system includes the first terminal device 80 in the embodiment corresponding to FIG. 8 and the communication device 10 in the embodiment corresponding to FIG. 10, to implement the information determining method in at least one embodiment.

At least one embodiment further provides another information determining system. The information determining system includes the first terminal device 90 in the embodiment corresponding to FIG. 9 and the communication device 110 in the embodiment corresponding to FIG. 11, to implement the information determining method in at least one embodiment.

Figure 12:
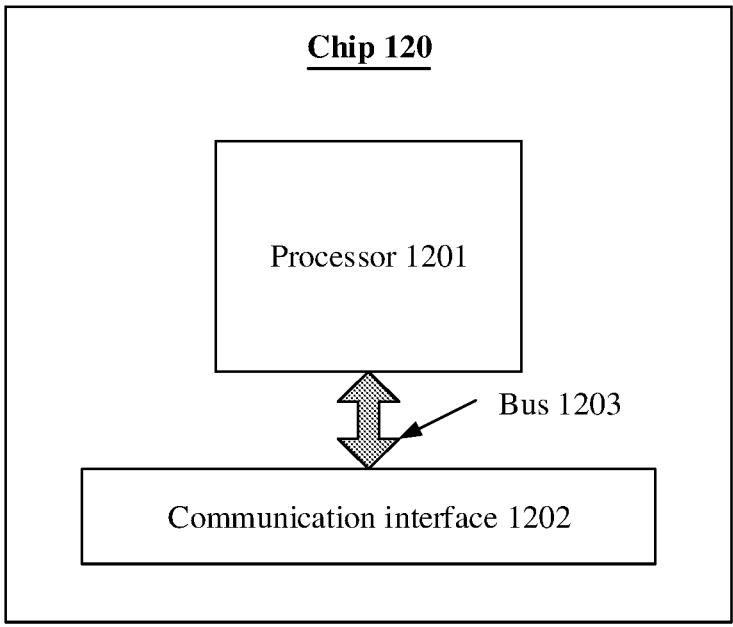
FIG. 12 is a schematic diagram of a structure of a communication chip according to at least one embodiment.

FIG. 12 is a schematic diagram of a structure of a communication chip according to at least one embodiment. As shown in FIG. 12, the communication chip 120 includes a processor 1201, and one or more communication interfaces 1202 coupled to the processor 1201. Details are as follows:

The processor 1201 is configured to read and execute computer-readable instructions. During specific implementation, the processor 1201 mainly includes a controller, an arithmetic unit, and a register. The controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and also performs an address operation and address translation. The register is mainly responsible for saving a quantity of register operations, intermediate operation results, and the like that are temporarily stored during instruction execution. During specific implementation, a hardware architecture of the processor 1201 is an application-specific integrated circuit (application-specific integrated circuits, ASIC) architecture, an MIPS architecture, an ARM architecture, an NP architecture, or the like. The processor 1201 is single-core, or is a multi-core.

The interface 1202 is configured to input a to-be-processed signal or data to the processor 1201, and output a processing result of the processor 1201. For example, the communication interface 1202 is a general-purpose input/output (general-purpose input/output, GPIO) interface, and is connected to a plurality of peripheral devices (for example, a display (LCD), a camera (camera), and a radio frequency (radio frequency, RF) module). The communication interface 1202 is connected to the processor 1201 through a bus 1203.

In at least one embodiment, the processor 1201 is configured to: invoke, from a memory, an implementation program of a first terminal device in an information determining method provided in one or more embodiments described herein, and execute instructions included in the program; or invoke, from a memory, an implementation program of a first network element in an information determining method provided in one or more embodiments described herein, and execute instructions included in the program. The communication interface 1202 is configured to output an execution result of the processor 1201. In at least one embodiment, the communication interface 1202 is specifically configured to: input first information of the first terminal device, output second information obtained through processing of the processor 1201, or the like. For the information determining method provided in one or more embodiments described herein, refer to the embodiments shown in FIG. 3 and FIG. 5 to FIG. 7. Details are not described herein again.

Functions corresponding to each of the processor 1201 and the communication interface 1202 is implemented by using a hardware design, or is implemented by using a software design, or is implemented by using a combination of software and hardware. This is not limited herein.

In the specification, claims, and accompanying drawings, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A person of ordinary skill in the art understands that sequence numbers of the foregoing processes do not mean execution sequences in at least one embodiment. The execution sequences of the processes should be determined based on functions and internal logic of the processes, and should not be construed as any limitation on the implementation processes of at least one embodiment.

What is claimed is:

1. An information determining method, comprising:
   sending, by a first terminal device, first information to a first network element, wherein the first information includes first indication information, and the first indication information is usable for determining a first access network device connected to the first terminal device; and
   receiving, by the first terminal device, second information from the first network element, wherein the second information is determined based on historical statistical information of a bandwidth between the first access network device and the first terminal device, the second information is usable for determining a first code rate, and the first code rate is determined based on the second information and at least one of the state information and the throughput information of the first terminal device, and indicates a code rate of media data of first media received by the first terminal device.

2. The method according to claim 1, wherein the sending the first indication information includes sending location information of the first terminal device and/or an identifier of the first access network device.

3. The method according to claim 1, wherein the sending the first information further includes sending first period indication information, and the first period indication information indicates a period within which the first terminal device receives the media data of the first media.

4. The method according to claim 1, wherein the sending the first information further includes sending one or more of the following information: a media identifier, an optional code rate, or state information of the first media, wherein the state information indicates a state of the media data of the first media buffered by the first terminal device.

5. The method according to claim 1, wherein the sending the first information further includes sending second indication information, the second indication information indicates a first user plane network element corresponding to the first terminal device, and the second information is determined based on the historical statistical information of the bandwidth between the first access network device and the first terminal device and historical statistical information of a bandwidth between the first access network device and the first user plane network element.

6. The method according to claim 1, wherein the determining the first code rate is based on the second information and one or both of the state information or throughput information of the first terminal device, and the state information indicates the state of the media data of the first media buffered by the first terminal device.

7. An information determining method, comprising:
receiving, by a first network element, first information from a first terminal device, wherein the first information includes first indication information;
determining, by the first network element based on the first indication information, a first access network device connected to the first terminal device;
determining, by the first network element, second information based on historical statistical information of a bandwidth between the first access network device and the first terminal device, wherein the second information is usable for determining a first code rate, and the first code rate is determined based on the second information and at least one of the state information and the throughput information of the first terminal device, and indicates a code rate of media data of first media received by the first terminal device; and
sending, by the first network element, the second information to a second network element.

8. The method according to claim 7, wherein the sending the second information to the second network element includes sending the second information to the first terminal device and/or a media server.

9. The method according to claim 7, wherein the receiving the first information further includes receiving first period indication information, and the first period indication information indicates a period within which the first terminal device receives the media data of the first media.

10. The method according to claim 7, wherein the receiving the first information further includes receiving one or more of the following information: a media identifier, an optional code rate, or state information of the first media, wherein the state information indicates a state of the media data of the first media buffered by the first terminal device.

11. The method according to claim 7, wherein the receiving the first information further includes receiving second indication information, and the second indication information indicates a first user plane network element corresponding to the first terminal device; and
the determining, by the first network element, second information based on historical statistical information of a bandwidth between the first access network device and the first terminal device includes:
determining, by the first network element, the second information based on the historical statistical information of the bandwidth between the first access network device and the first terminal device and historical statistical information of a bandwidth between the first access network device and the first user plane network element.

12. The method according to claim 7, wherein the determining the second information includes determining a recommended code rate or information about a first bandwidth.

13. The method according to claim 12, wherein the determining, by the first network element, second information based on historical statistical information of a bandwidth between the first access network device and the first terminal device includes:
determining, by the first network element, the information about the first bandwidth between the first terminal device and the first access network device based on the historical statistical information of the bandwidth between the first access network device and the first terminal device; and
determining, by the first network element, the recommended code rate based on the information about the first bandwidth.

14. The method according to claim 7, wherein the method further comprises:
receiving, by the first network element, an identifier of a second terminal device, wherein there are one or more second terminal devices, and the second terminal device is a terminal device that receives media data of second media through the first access network device; and
the determining, by the first network element, second information based on historical statistical information of a bandwidth between the first access network device and the first terminal device includes:
determining, by the first network element, the second information based on the identifier of the second terminal device and the historical statistical information of the bandwidth between the first access network device and the first terminal device.

15. A communication apparatus, comprising:
memory storing a computer program; and
a processor, coupled to the memory, the processing being configured to execute the computer program stored in the memory to perform operations of:
sending first information to a first network element, wherein the first information includes first indication information, and the first indication information is usable for determining a first access network device connected to the first terminal device; and
receiving second information from the first network element, wherein the second information is determined based on historical statistical information of a bandwidth between the first access network device and the first terminal device, the second information is usable for determining a first code rate, and the first code rate is determined based on the second information and at least one of the state information and the throughput information of the first terminal device, and indicates a code rate of media data of first media received by the first terminal device.

16. A communication apparatus, comprising:
memory storing a computer program; and a processor, coupled to the memory, the processor being configured to execute the computer program stored in the memory to perform operations of:

receiving first information from a first terminal device, wherein the first information includes first indication information;

determining, based on the first indication information, a first access network device connected to the first terminal device;

determining second information based on historical statistical information of a bandwidth between the first access network device and the first terminal device, wherein the second information is useable for determining a first code rate, and the first code rate is determined based on the second information and at least one of the state information and the throughput information of the first terminal device, and indicates a code rate of media data of first media received by the first terminal device; and sending the second information to a second network element.

* * * * *